(12) United States Patent
Xiang et al.

(10) Patent No.: US 12,262,426 B2
(45) Date of Patent: Mar. 25, 2025

(54) DUAL 5G CONNECTION MECHANISMS TO SUPPORT MULTI-OPERATORS WITH DIFFERENT SERVICE TRAFFIC SIMULTANEOUSLY

(71) Applicant: Huawei Technologies Co., Ltd., Shenzhen (CN)

(72) Inventors: Zhixian Xiang, Frisco, TX (US); Mazin Ali Al-Shalash, Frisco, TX (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 414 days.

(21) Appl. No.: 17/720,964

(22) Filed: Apr. 14, 2022

(65) Prior Publication Data

US 2022/0240330 A1 Jul. 28, 2022

Related U.S. Application Data

(63) Continuation of application No. PCT/US2020/055409, filed on Oct. 13, 2020.

(60) Provisional application No. 62/976,094, filed on Feb. 13, 2020, provisional application No. 62/959,589, filed on Jan. 10, 2020, provisional application No. 62/914,882, filed on Oct. 14, 2019.

(51) Int. Cl.
*H04W 56/00* (2009.01)
*H04L 12/46* (2006.01)
*H04W 76/12* (2018.01)

(52) U.S. Cl.
CPC ......... *H04W 76/12* (2018.02); *H04L 12/4633* (2013.01); *H04W 56/001* (2013.01)

(58) Field of Classification Search
CPC .. H04W 76/12; H04W 56/001; H04L 12/4633
USPC ......................................................... 370/254
See application file for complete search history.

(56) References Cited

U.S. PATENT DOCUMENTS

| | | | |
|---|---|---|---|
| 6,731,617 B1 * | 5/2004 | Mizell | H04W 8/26 455/433 |
| 2016/0165576 A1 * | 6/2016 | Awoniyi-Oteri | H04B 1/0064 370/338 |

(Continued)

OTHER PUBLICATIONS

"3rd Generation Partnership Project; Technical Specification Group Technical Specification Group Services and System Aspects: Study on enhancement of 5G System (5GS) for vertical and Local Area Network (LAN services (Release 16)", 3GPP Standard; Technical Report; 3GPP TS 23.734, Mobile Competence Centre, F-06921, No. V16.2.0. 1-117 Pages.

(Continued)

*Primary Examiner* — Sai Ming Chan
(74) *Attorney, Agent, or Firm* — Slater Matsil, LLP

(57) ABSTRACT

A transmit chain (TX chain) of a user equipment (UE) transmits an uplink signal to a first wireless network associated with a first base station or a second wireless network associated with a second base station. The uplink signal includes information indicative of a first receive chain (RX chain) of the UE being synchronized to the first base station to receive first traffic from the first wireless network, and a second RX chain of the UE being synchronized to the second base station to receive second traffic from the second wireless network. The UE transmits uplink traffic for the first wireless network and the second wireless network to the second base station via the TX chain of the UE.

21 Claims, 11 Drawing Sheets

(56) References Cited

U.S. PATENT DOCUMENTS

2019/0222375 A1* 7/2019 Wu .................. H04L 5/0035
2019/0239178 A1* 8/2019 Shilov ............... H04W 56/002
2021/0092651 A1* 3/2021 Sayenko ............ H04W 56/00

OTHER PUBLICATIONS

"3rd Generation Partnership Project, Technical Specification Group Services and System Aspects; System Architecture for the 5G System (5GS); Stage 2 (Release 16)", 3GPP Standard; Technical Specification; 3GPP TS 23.501, V16.2.0, Sep. 2019, 1-391 Pages.

"3rd Generation Partnership Project; Technical Specification Group Services and System Aspects; Study on enhanced support of non-public networks (Release 17)", 3GPP TR 23.700-07 V0.0.0, Oct. 2019, 9 Pages.

Ebu, et al., "Proposal for consolidated service requirements of AVPROD", 3GPP TSG-SA WG1 Meeting #86, S1-191527, (revision of S1-191160 and S1-191485), May 6-11, 2019, 16 Pages, Suzhou, China.

Futurewei et al., "KI #2, New Sol: simultaneous connection with NPN and PLMN with QoS consideration for VIAPA", 3GPP SA WG2 Meeting #139e, S2-2004235, Jun. 1-5, 2020, 7 Pages.

Sennheiser, et al., "Clean-up (Review) of the "Live production with integrated audience services" use case", 3GPP TSG-SA WG1 Meeting #87, S1-192739, (revision of S1-192515, S1-192205), Aug. 19-23, 2019, 6 Pages, Sophia-Antipolis, FR.

* cited by examiner

DUAL 5G CONNECTION MECHANISMS TO SUPPORT MULTI-OPERATORS WITH DIFFERENT SERVICE TRAFFIC SIMULTANEOUSLY

CROSS-REFERENCE TO RELATED APPLICATIONS

This application is a continuation of International Application PCT/US2020/055409 filed on Oct. 13, 2020, which claims the benefit of U.S. Provisional Application No. 62/914,882, filed on Oct. 14, 2019, entitled "Dual 5G Connection Mechanism to Support Multi-Operators With Different Service Traffic Simultaneously," U.S. Provisional Application No. 62/959,589, filed on Jan. 10, 2020, entitled "Methods and Apparatus for Service Continuity Coordination Between NPN and Public Network for Ultra High Data Rate and Low Latency Traffic," and U.S. Provisional Application No. 62/976,094, filed on Feb. 13, 2020, entitled "Methods and Apparatus for Uplink Traffic Handling for Multi-Network Connections," all of which are hereby incorporated herein by reference in their entirety.

TECHNICAL FIELD

The present invention relates generally to network communications, and in particular embodiments, to dual 5G connection mechanisms to support multi-operators with different service traffic simultaneously.

BACKGROUND

During large live production events, such as music festivals, attendees desire to listen to live audio produced during the events. It is common that certain locations within an event site may have poor audio reproduction for listeners within those locations. In such scenarios, problems may arise due to distances from the loudspeakers to the audience resulting in propagation delays. If a listener is in a position to receive audio from more than one public address system (PA) system simultaneously, it is very likely that the propagation delays of the PAs are not synchronized, causing a noticeably echo/reverberation effect. Such conditions result in a poor quality listening experience. Another problem occurs when performances are played at more than one stage simultaneously, as is usual in a large music festival. In that case, the listener may receive audio simultaneously from more than one stage, which will also degrade its perceived audio quality.

Therefore, there is a need for systems and method for providing improved distribution of audio and other service traffic to users within a service area.

SUMMARY

Example embodiments provide a method, system, and apparatus for a dual connection mechanism to support multi-operators with different service traffic simultaneously.

In accordance with an example embodiment, a method includes transmitting, via a transmit chain (TX chain) of a user equipment (UE), an uplink signal to a first wireless network associated with a first base station or a second wireless network associated with a second base station, the uplink signal including information indicative of a first receive chain (RX chain) of the UE being synchronized to the first base station to receive first traffic from the first wireless network and a second RX chain of the UE being synchronized to the second base station to receive second traffic from the second wireless network. The method further includes transmitting, by the UE, uplink traffic for the first wireless network and the second wireless network to the second base station via the TX chain of the UE.

Optionally, in any of the preceding embodiments, the method further includes establishing, by the UE, a communication tunnel with the first base station over the TX chain, the TX chain being synchronized with the second base station.

Optionally, in any of the preceding embodiments, the transmitting of the uplink signal to the first base station uses the communication tunnel.

Optionally, in any of the preceding embodiments, data associated with the uplink signal to the first base station is encapsulated in an over-the-top (OTT) internet protocol (IP) packet.

Optionally, in any of the preceding embodiments, the communication tunnel is established between the first wireless network and the second wireless network, the communication tunnel allowing the UE to communicate with the first wireless network associated with the first base station via the second wireless network associated with the second base station.

Optionally, in any of the preceding embodiments, the information further includes an indication that the TX chain of the UE will be synchronized with the second base station only, the uplink traffic to the first wireless network passing through the second wireless network associated with the second base station.

Optionally, in any of the preceding embodiments, the information further includes an indication that the TX chain of the UE will be synchronized and communicate with the first base station associated with the first wireless network either periodically or on-demand, and will be re-synchronized with the second base station.

Optionally, in any of the preceding embodiments, the information further includes at least one of a reason code, an indication of an interval for periodic synchronization, or an indication of a time period for the TX chain of the UE to be synchronized with the first base station.

Optionally, in any of the preceding embodiments, the method further includes receiving, by the UE, a request from the first base station or the second base station requesting the UE to synchronize the first RX chain of the UE to the first base station to receive the first traffic from first wireless network, and synchronize the second RX chain of the UE to the second base station to receive the second traffic from the second wireless network.

Optionally, in any of the preceding embodiments, the synchronizing of the first RX chain and the second RX chain is responsive to receiving the request and user traffic.

Optionally, in any of the preceding embodiments, the request further requests the UE to synchronize the TX chain to one or more of the first base station or the second base station to transmit user traffic.

Optionally, in any of the preceding embodiments, the synchronizing of the first RX chain and the second RX chain is initiated by the UE.

Optionally, in any of the preceding embodiments, the UE transmits the uplink signal to an application server and the second wireless network associated with the second base station, the application server and the second wireless network being configured to notify the first base station of the synchronizing of the first RX chain and the second RX chain.

Optionally, in any of the preceding embodiments, the uplink signal further includes an indication of a start time for the UE to receive at least one of first data from the first base station or second data from the second base station.

Optionally, in any of the preceding embodiments, the first base station is associated with one of a mobile network operator (MNO) network or a non-public network (NPN).

Optionally, in any of the preceding embodiments, the second base station is associated with one of a mobile network operator (MNO) network or a non-public network (NPN).

Optionally, in any of the preceding embodiments, at least one of the first base station or the second base station is configured to provide one or more of a mobile broadcast service (MBS), unicast service, or other services to the UE.

Optionally, in any of the preceding embodiments, the synchronizing of the first RX chain and the second RX chain are responsive to receiving user and control traffic from the first wireless network and the second wireless network, respectively.

In accordance with another example embodiment, a user equipment (UE) includes a non-transitory memory storage comprising instructions, and one or more processors in communication with the memory storage. The one or more processors execute the instructions to transmit, via a transmit chain (TX chain) of the user equipment (UE), an uplink signal to a first wireless network associated with a first base station or a second wireless network associated with a second base station, the uplink signal including information indicative of a first receive chain (RX chain) of the UE being synchronized to the first base station to receive first traffic from the first wireless network and a second RX chain of the UE being synchronized to the second base station to receive traffic from the second wireless network. The one or more processors further execute the instructions to transmit uplink traffic for the first wireless network and the second wireless network to the second base station via the TX chain of the UE.

Optionally, in any of the preceding embodiments, the UE further includes instructions to establish a communication tunnel with the first base station over the TX chain, the TX chain being synchronized with the second base station.

Optionally, in any of the preceding embodiments, the transmitting of the uplink signal to the first base station uses the communication tunnel.

Optionally, in any of the preceding embodiments, the communication tunnel is established between the first wireless network and the second wireless network, the communication tunnel allowing the UE to communicate with the first wireless network associated with the first base station via the second wireless network associated with the second base station.

Optionally, in any of the preceding embodiments, the UE further includes instructions to receive a request from the first wireless network associated with the first base station or the second wireless network associated with the second base station requesting the UE to synchronize the first RX chain of the UE to the first base station to receive the first traffic from first wireless network, and synchronize the second RX chain of the UE to the second base station to receive the second traffic from the second wireless network.

Optionally, in any of the preceding embodiments, the synchronizing of the first RX chain and the second RX chain is responsive to receiving the request.

Optionally, in any of the preceding embodiments, the request further requests the UE to synchronize the TX chain to one or more of the first base station or the second base station.

Optionally, in any of the preceding embodiments, the synchronizing of the first RX chain and the second RX chain is initiated by the UE.

Optionally, in any of the preceding embodiments, the UE transmits the uplink signal to an application server and the second wireless network associated with the second base station, the application server and the second wireless network being configured to notify the first base station of the synchronizing of the first RX chain and the second RX chain.

Optionally, in any of the preceding embodiments, the uplink signal further includes an indication of a start time for the UE to receive at least one of first data from the first base station or second data from the second base station.

Optionally, in any of the preceding embodiments, the synchronizing of the first RX chain and the second RX chain are responsive to receiving user and control traffic from the first wireless network and second wireless network, respectively.

In accordance with another example embodiment, a method includes receiving, by a first base station associated with a first wireless network, via a transmit chain (TX chain) of a user equipment (UE), an uplink signal, the uplink signal including information indicative of a first receive chain (RX chain) of the UE being synchronized to the first base station to receive first traffic from the first wireless network, and a second RX chain of the UE being synchronized to a second base station associated with a second wireless network to receive second traffic from the second wireless network.

Optionally, in any of the preceding embodiments, the method further includes transmitting, by the first base station, a request to the UE requesting the UE to synchronize the first RX chain of the UE to the first base station and synchronize the second RX chain of the UE to the second base station.

Optionally, in any of the preceding embodiments, the method further includes notifying, by the first base station, the second base station of the synchronizing of the first RX chain and the second RX chain.

Optionally, in any of the preceding embodiments, the uplink signal further includes an indication of a start time for the UE to receive at least one of first data from the first base station or second data from the second base station.

Optionally, in any of the preceding embodiments, the information further includes an indication that the TX chain of the UE will be synchronized with the second base station only, the uplink traffic to the first wireless network passing through the second wireless network associated with the second base station.

Optionally, in any of the preceding embodiments, a communication tunnel is established between the first wireless network and the second wireless network, the communication tunnel allowing the UE to communicate with the first wireless network and the first base station via the second wireless network of the second base station.

In accordance with another example embodiment, a first base station associated with a first wireless network includes a non-transitory memory storage comprising instructions and one or more processors in communication with the memory storage. The one or more processors execute the instructions to receive via a transmit chain (TX chain) of a user equipment (UE), an uplink signal, the uplink signal including information indicative of a first receive chain (RX chain) of the UE being synchronized to a first base station to receive first traffic from the first wireless network and a second RX chain of the UE being synchronized to a second base station associated with a second wireless network to receive second traffic from the second wireless network.

Optionally, in any of the preceding embodiments, the first base station further includes instructions to transmit a request to the UE requesting the UE to synchronize the first RX chain of the UE to the first base station and synchronize the second RX chain of the UE to the second base station.

Optionally, in any of the preceding embodiments, the first base station further includes instructions to notify, by the first base station, the second base station of the synchronizing of the first RX chain and the second RX chain.

In accordance with another example embodiment, a method includes registering, by a communication device, with a first network, and transmitting, by the communication device, a first service request including a traffic split indication to a second network, the first service request initiating a first network service procedure with the second network to create a first traffic path for the communication device. The method further includes transmitting, by the communication device, a second service request including a traffic split indication to the second network using an interworking gateway over a communication tunnel with the first network, the second service request initiating a second network service procedure with the second network to create a second traffic path for the device over the communication tunnel with the first network, and communicating, by the communication device based on the traffic split indication, first data using the first traffic path from the second network and second data with the second network using the interworking gateway over the communication tunnel with the first network.

Optionally, in any of the preceding embodiments, the method further includes completing, by the communication device, the first network service procedure with the second network for the first traffic path.

Optionally, in any of the preceding embodiments, the method further includes completing, by the communication device, the second network service procedure with the second network for the second traffic path using the interworking gateway over the communication tunnel with the first network.

Optionally, in any of the preceding embodiments, the method further includes initiating, by the communication device, a session with the second network using the interworking gateway over the communication tunnel with the first network.

Optionally, in any of the preceding embodiments, the first service request is included in at least one of a device network registration procedure with the second network, another service request with the second network, or a change procedure with the second network.

Optionally, in any of the preceding embodiments, the traffic split indication includes information indicative of at least one of user traffic routing or quality of service (QoS) information.

Optionally, in any of the preceding embodiments, the information indicative of user traffic routing includes an indication that uplink traffic will use the second traffic path and at least a portion of the downlink traffic will use the first traffic path.

Optionally, in any of the preceding embodiments, the QoS information includes at least one of a QoS requirement, a configuration for each of the first traffic path and the second traffic path, or an indication that a particular QoS policy associated with a subscription by the communication device can be used by the first network and the second network for a traffic split between the first traffic path and the second traffic path.

Optionally, in any of the preceding embodiments, the traffic split indication includes information indicative of a first receive chain (RX chain) of the communication device being synchronized to the first network to receive a first portion of user traffic via the first network, and a second RX chain of the communication device being synchronized to the second network to receive a second portion of the user traffic via the second network.

Optionally, in any of the preceding embodiments, the method further includes receiving, by the communication device using the second RX chain, second data from the second network.

Optionally, in any of the preceding embodiments, the method further includes receiving, by the communication device using the first RX chain, third data directly from the first network.

Optionally, in any of the preceding embodiments, the method further includes the communication device is a user equipment (UE).

Optionally, in any of the preceding embodiments, the first network comprises a non-public network (NPN).

Optionally, in any of the preceding embodiments, the second network comprises a public land mobile network (PLMN).

In accordance with another example embodiment, a communication device includes a non-transitory memory storage comprising instructions, and one or more processors in communication with the memory storage. The one or more processors execute the instructions to register, by a communication device, with a first network, and transmit, by the communication device, a first service request including a traffic split indication to a second network, the first service request initiating a first network service procedure with the second network to create a first traffic path for the communication device. The one or more processors further execute the instructions to transmit, by the communication device, a second service request including a traffic split indication to the second network using an interworking gateway over a communication tunnel with the first network, the second service request initiating a second network service procedure with the second network to create a second traffic path for the device over the communication tunnel with the first network. The one or more processors further execute the instructions to communicate, by the communication device based on the traffic split indication, first data using the first traffic path from the second network and second data with the second network using the interworking gateway over the communication tunnel with the first network.

Optionally, in any of the preceding embodiments, the communication device further includes instructions to complete, by the communication device, the first network service procedure with the second network for the first traffic path.

Optionally, in any of the preceding embodiments, the communication device further includes instructions to complete, by the communication device, the second network service procedure with the second network for the second traffic path using the interworking gateway over the communication tunnel with the first network.

Optionally, in any of the preceding embodiments, the communication device further includes instructions to initiate, by the communication device, a session with the second network using the interworking gateway over the communication tunnel with the first network.

Optionally, in any of the preceding embodiments, the first service request is included in at least one of a device network registration procedure with the second network, another service request with the second network, or a change procedure with the second network.

Optionally, in any of the preceding embodiments, the traffic split indication includes information indicative of at least one of user traffic routing or quality of service (QoS) information.

Optionally, in any of the preceding embodiments, the traffic split indication includes information indicative of a first receive chain (RX chain) of the communication device being synchronized to the first network to receive a first portion of user traffic via the first network, and a second RX chain of the communication device being synchronized to the second network to receive a second portion of the user traffic via the second network.

Optionally, in any of the preceding embodiments, the communication device further includes instructions to receive, by the communication device using the second RX chain, second data from the second network.

Optionally, in any of the preceding embodiments, the communication device further includes instructions to receive, by the communication device using the first RX chain, third data directly from the first network.

Optionally, in any of the preceding embodiments, the communication device is a user equipment (UE).

In accordance with another example embodiment, a method includes receiving, by a first network element of a first network, a first service request including a traffic split indication to a second network from a communication device, the first service request initiating a first network service procedure with the second network to create a first traffic path for the communication device. The method further includes receiving, by a second network element of the second network, a second service request including a traffic split indication to the second network using an interworking gateway over a communication tunnel with the first network, the second service request initiating a second network service procedure with the second network to create a second traffic path for the communication device over the communication tunnel with the first network. The method still further includes communicating, with the communication device based on the traffic split indication, first data using the first traffic path from the second network and second data with the second network using the interworking gateway over the communication tunnel with the first network.

Optionally, in any of the preceding embodiments, the method further includes completing the first network service procedure with the second network for the first traffic path.

Optionally, in any of the preceding embodiments, the method further includes completing the second network service procedure with the second network for the second traffic path using the interworking gateway over the communication tunnel with the first network.

Optionally, in any of the preceding embodiments, the method further includes mapping a quality of service (QoS) relationship between the first traffic path and the second traffic path, the QoS relationship including information indicative of a QoS associated with each of the first traffic path and the second traffic path.

Optionally, in any of the preceding embodiments, the method further includes receiving, by the second network element, a notification from the first network indicative of a QoS change of the second traffic path.

Optionally, in any of the preceding embodiments, the first service request is included in at least one of a device network registration procedure with the second network, another service request with the second network, or a change procedure with the second network.

Optionally, in any of the preceding embodiments, the traffic split indication includes information indicative of at least one of user traffic routing or quality of service (QoS) information.

Optionally, in any of the preceding embodiments, the information indicative of user traffic routing includes an indication that uplink traffic will use the second traffic path and at least a portion of downlink traffic will use the first traffic path.

Optionally, in any of the preceding embodiments, the QoS information includes at least one of a QoS requirement, a configuration for each of the first traffic path and the second traffic path, or an indication that a particular QoS policy associated with a subscription by the communication device can be used by the first network and the second network for a traffic split between the first traffic path and the second traffic path.

Optionally, in any of the preceding embodiments, the traffic split indication includes information indicative of a first receive chain (RX chain) of the communication device being synchronized to the first network to receive a first portion of user traffic via the first network, and a second RX chain of the communication device being synchronized to the second network to receive a second portion of the user traffic via the second network.

Optionally, in any of the preceding embodiments, the communication device is a user equipment (UE).

In accordance with another example embodiment, a system includes a first network element associated with a first network including a first non-transitory memory storage comprising instructions, and one or more first processors in communication with the memory storage, wherein the one or more first processors execute the instructions to receive a first service request including a traffic split indication to a second network from a communication device, the first service request initiating a first network service procedure with the second network to create a first traffic path for the communication device. The system further includes a second network element associated with a second network including a second non-transitory memory storage comprising instructions and one or more second processors in communication with the memory storage, wherein the one or more second processors execute the instructions to receive a second service request including a traffic split indication to the second network using an interworking gateway over a communication tunnel with the first network, the second service request initiating a second network service procedure with the second network to create a second traffic path for the communication device over the communication tunnel with the first network. The second network element further includes instructions to communicate, with the communication device based on the traffic split indication, first data using the first traffic path from the second network and second data with the second network using the interworking gateway over the communication tunnel with the first network.

Optionally, in any of the preceding embodiments, the system further includes instructions to map a quality of service (QoS) relationship between the first traffic path and the second traffic path, the QoS relationship including information indicative of a QoS associated with each of the first traffic path and the second traffic path.

Optionally, in any of the preceding embodiments, the system further includes instructions to receive, by the second network element, a notification from the first network indicative of a QoS change of the second traffic path.

Optionally, in any of the preceding embodiments, the traffic split indication includes information indicative of at least one of user traffic routing or quality of service (QoS) information.

Optionally, in any of the preceding embodiments, the information indicative of user traffic routing includes an indication that uplink traffic will use the second traffic path and at least a portion of downlink traffic will use the first traffic path.

Optionally, in any of the preceding embodiments, the QoS information includes at least one of a QoS requirement, a configuration for each of the first traffic path and the second traffic path, or an indication that a particular QoS policy associated with a subscription by the communication device can be used by the first network and the second network for a traffic split between the first traffic path and the second traffic path.

Optionally, in any of the preceding embodiments, the traffic split indication includes information indicative of a first receive chain (RX chain) of the communication device being synchronized to the first network to receive a first portion of user traffic via the first network, and a second RX chain of the communication device being synchronized to the second network to receive a second portion of the user traffic via the second network.

Practice of the foregoing embodiments may provide for a tunneling mechanism between a UE and a NPN via an MNO to allow the UE to establish and transmit data to the NPN without impacting the ongoing active communication with its MNO. Practice of the foregoing embodiments may further provide for a notification mechanism between a UE and a network to allow a UE to split traffic between two networks, in which the network receives a notification of a potential Quality of Service (QoS) performance impact caused by the traffic split.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims.

Figure 1:
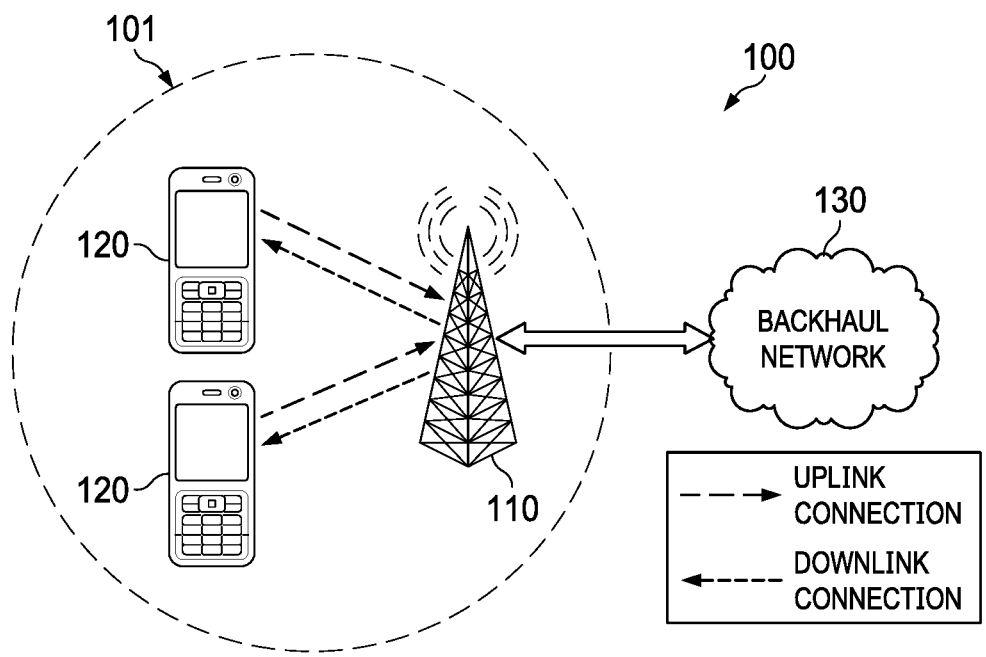
FIG. 1 illustrates an embodiment of a wireless communications network.

FIG. 1 illustrates an embodiment of a wireless communications network 100 for communicating data. The network 100 comprises a base station no having a coverage area 101, a plurality of mobile devices 120, and a backhaul network 130. As shown, the base station 110 establishes uplink (dashed line) and/or downlink (dotted line) connections with the mobile devices 120, which serve to carry data from the mobile devices 120 to the base station no and vice-versa. Data carried over the uplink/downlink connections may include data communicated between the mobile devices 120, as well as data communicated to/from a remote-end (not shown) byway of the backhaul network 130. As used herein, the term "base station" refers to any component (or collection of components) configured to provide wireless access to a network, such as an enhanced base station (eNB), a macro-cell, a femtocell, a Wi-Fi access point (AP), or other wirelessly enabled devices. Base stations may provide wireless access in accordance with one or more wireless communication protocols, e.g., long term evolution (LTE), LTE advanced (LTE-A), High Speed Packet Access (HSPA), Wi-Fi 802.11a/b/g/n/ac, etc. As used herein, the term "mobile device" refers to any component (or collection of components) capable of establishing a wireless connection with a base station, such as a user equipment (UE), a mobile station (STA), and other wirelessly enabled devices. In some embodiments, the network 100 may comprise various other wireless devices, such as relays, low power nodes, etc.

During large live production events, such as music festivals, attendees desire to listen to live audio produced during the events. It is common that certain locations within an event site may have poor audio reproduction for listeners within those locations. In such scenarios, problems may arise due to distances from the loudspeakers to the audience resulting in propagation delays. If a listener is in a position to receive audio from more than one public address system (PA) system simultaneously, it is very likely that the propagation delays of the PAs are not synchronized, causing a noticeably echo/reverberation effect. Such conditions result in a poor quality listening experience. A PA may refer to an electronic system used to increase the apparent volume (e.g., loudness) of acoustic sound sources. PAs are typically used in a public venue for amplification of sound sources to make them sufficiently audible over the whole event area. Another problem occurs when performances are played at more than one stage simultaneously, as is usual in a large music festival. In that case, the listener may receive audio simultaneously from more than one stage, which will also degrade its perceived audio quality. The degradation in audio quality may be particularly significant to listeners with hearing impairments.

A listener may obtain a better quality sound experience by listening to a direct mix coming from the mixing desk, or by the inclusion of 3D sound effects that would not be possible to provide with loudspeakers over the wide festival area. In order to achieve the benefits of better audio experience, a possible solution is to provide high quality audio playback over headphones to listeners who are carrying their own devices. Services are being considered to allow concert attendants to use user equipment (UE) devices, such as smartphones, to connect to a 5G concert private network to receive a high quality audio stream, and also connect to their own mobile network operators (MNOs) to receive other data service at the same time. An MNO may be an operator owning and operating a network for public use. Such services have been launched using WiFi connections, but due to the nature of unlicensed WiFi deployment, the performance is not satisfactory. Accordingly, 5G technology is being considered for providing audio services to attendees using UEs. In addition, if using a WiFi private network, there is no standard impact for 3GPP because current smartphones already support simultaneously connecting to both an MNO's mobile network and a WiFi private network.

Figure 2:
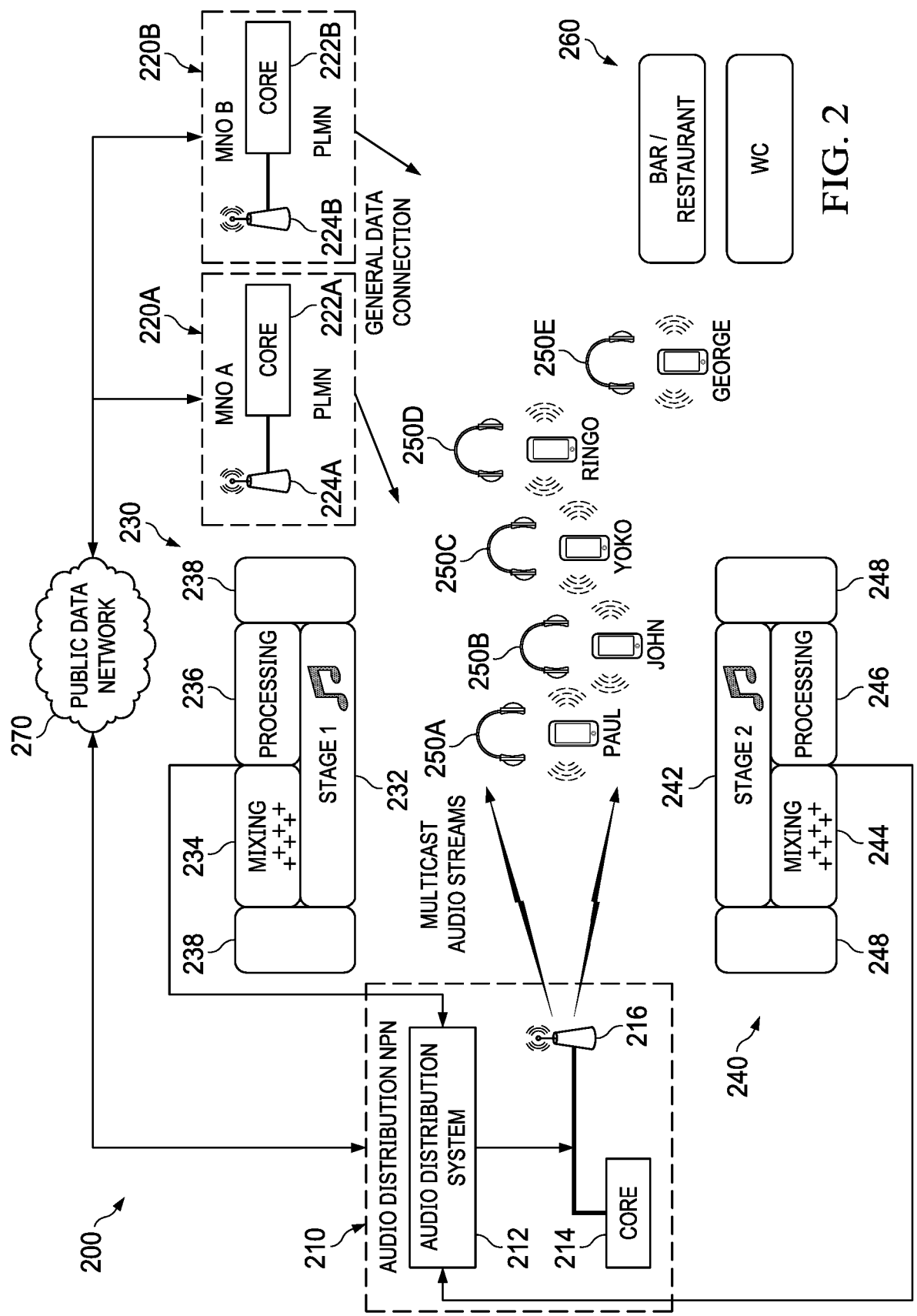
FIG. 2 illustrates a wireless communication network 200 showing an example use case according to an embodiment

FIG. 2 illustrates a wireless communication network 200 showing an example use case according to an embodiment. The network 200 includes an audio distribution non-public network (NPN) 210 in communication with a first public land mobile network (PLMN) 220A associated with a first MNO (MNO A) having a core 222A and base station 224A, and a second PLMN associated with a second MNO (MNO B) having a core 222B and base station 224B. An NPN may refer to a network that is intended for non-public use. The audio distribution NPN 210 is configured to receive audio from a stage 1 audio processing system 230 associated with a first stage and a stage 2 audio processing system 240 associated with a second stage. The audio distribution NPN 210 includes an audio distribution system 212, a core 214, and a base station 216. The stage 1 audio processing system 230 includes a stage 232 having one or more audio sources, such as microphones and/or musical instruments, an audio mixing system 234, an audio processing system 236, and speakers 238. The one or more audio sources of stage 232 provide audio signals to the audio mixing system 234 and audio processing system 236 for mixing and processing the audio signals, respectively. The processed audio is provided to the audio distribution system 212 of audio distribution NPN 210 and speakers 238.

Similarly, the stage 2 audio processing system 240 includes a stage 242 having one or more audio sources, an audio mixing system 244, an audio processing system 246, and speakers 248. The one or more audio sources of stage 242 provide audio signals to the audio mixing system 244 and audio processing system 246 for mixing and processing the audio signals, respectively. The processed audio is provided to the audio distribution system 212 of audio distribution NPN 210 and speakers 248.

The base station 216 of audio distribution NPN 210 is configured to broadcast one or more multicast audio streams to UEs 250A-250E. Each of the UEs 250A-250E is associated with an attendee of an event. In a particular embodiment, each of the UEs 250A-250E is associated with a headset for providing an audible reproduction of one or more of the multicast audio streams. The first PLMN 220A and second PLMN 220B are configured to provide a general data connection to one or more of the UEs 250A-250E.

In a particular use case, a listener, Paul, associated with the UE 250A (e.g., a smart phone) A is located at a good position to listen to a band playing in the first stage 230, but wants to hear a better quality audio stream including a three-dimensional (3D) enhanced version using the UE 250A and high-quality headphones. If Paul doesn't have a subscription the audio distribution NPN 210, he can quickly sign up for the service online and receive a correct credential from the network. Paul turns on an application installed on the UE 250A, which connects to the audio distribution system 212 using the audio distribution NPN 210. A list of available channels is displayed to Paul by the UE 250A, and he chooses to listen to stage 1 with enhanced 3D. The applications starts playback of the requested audio through Paul's headphones, which may have not enough acoustic insulation to block the PA system of the event, and Paul listens to both the PA system and the requested audio using headphones. The time difference between Paul's headphone sound and the sound coming from the PA system is small, and doesn't result in noticeable audio artifacts like reverberation or echo effects.

Example performance requirements to support such use cases having live production with integrated audience service are given in Table 1 below:

TABLE 1

| Characteristic Parameters | | | | | Influence Quantity | | |
| --- | --- | --- | --- | --- | --- | --- | --- |
| End-to-end latency (Note 1) | Reliability | Data rate (DL) | # parallel audio links | # receiving users per link (Note 3) | Transfer interval (Note 2) | UE speed | Service Area |
| ≤5 ms | 99.9% | ≤2 Mbit/s | <30 | <50000 | 5 ms | ≤5 km/h | ≤2.25 km² |

NOTE 1:
The end-to-end latency is required for the downlink (central mixing console to the users' headphones).
NOTE 2:

TABLE 1-continued

| Characteristic Parameters | | | | | | Influence Quantity | |
|---|---|---|---|---|---|---|---|
| End-to-end latency (Note 1) | Reliability | Data rate (DL) | # parallel audio links | # receiving users per link (Note 3) | Transfer interval (Note 2) | UE speed | Service Area |

Transfer interval refers to periodicity of the packet transfers. It should be constant during the whole operation. The value given in the table is a typical value, however other transfer intervals influences the end-to-end latency requirement.
NOTE 3:
Here, it is the same content sent to all the devices.

A 3GPP system should be able to enable a UE to receive low-latency downlink multicast traffic from one network (e.g. an NPN), and paging as well as other data services from another network (e.g. PLMN) simultaneously.

Many existing UEs include one transmitter and two receivers, and when the UE is receiving broadcast traffic from a private network, no uplink is allowed for the private network, e.g., when the UE is accessing the NPN. A problem arises regarding how the UE can transmit uplink traffic to an MNO when connected to the NPN, especially for control plane traffic to an eNB. Additionally, when only one transmitter is available to the UE, when the UE switches between networks the other network RAN is suspended which can be detrimental to the user experience. In addition, switching of the transmitter between different networks increases system complexity. When the UE is connected to the private network, in order for the UE to split the transmitter between the private network and the MNO, it would be desirable for a mechanism to exist to inform the network of the UE's capability and transmitter/receiver configuration changes to enable the network to respond correspondingly. Accordingly, it is desirable to provide a solution to allow a single transmitter of a UE to communicate simultaneously with two networks (e.g., a private network and an MNO).

In order to keep latency to controllable levels, it is desirable that the audio distribution system is at the edge of the network, meaning that the UEs will only benefit from the audio distribution system if the UEs are in the same physical network as the audio distribution system. Therefore, any solution which uses a public network to route those ultra-reliable low latency communication (URLLC) data is not desirable. In addition, for reasons of data privacy and performance guarantee, a media production company may prefer to have a private network with a dedicated spectrum for the concert or performance so that users may connect to and are authorized into the private network instead of using their own MNO network. Accordingly, mechanisms for guaranteeing the quality of service for both users using the MNO (e.g., normal cellular network data/voice services) as well as the users listening to the stream of the audio distribution system. Additionally, the listeners of the audio distribution system would bring their own mobile devices which will most likely be served by different MNOs. Therefore, a mechanism is desired to allow different MNOs' users to connect to the same private network.

Because the concert as well as multicast broadcast service (MBMS) received by the user may require payment of a fee, the NPN may need to make sure that only UEs that are located in the premise of the event (e.g., a concert) can receive the MBMS traffic. Therefore, a mechanism may apply a restriction on who can receive MBMS in this particular location, or restrictions specifying that those who subscribe to the service can listen to the MBMS.

Embodiments of the present disclosure provide a tunneling mechanism between a UE and a NPN via an MNO to allow the UE to establish and transmit data to the NPN via an application server, without impacting the ongoing active communication with its MNO.

Embodiments of the present disclosure also provide a notification mechanism between a UE and a network to allow a smooth UE receiver split to support two networks, in which the network receives a notification of a potential Quality of Service (QoS) performance impact caused by the traffic split. In some embodiments, a new radio access network (RAN) user indirect function (UIF) and APIs are provided to allow a UE which is receiving Multicast/broadcast traffic via this RAN to indirectly interact with the RAN via an over-the-top tunnel connection through another network, without transmitting data via a Uu interface with the RAN. In other embodiments, the communication tunnel may be established with another function of the RAN or to an eNB.

The RAN UIF may include the following the functionalities: establish and maintain the over the top IP connection with the authorized UE, collect the UE's air-interface measurement, including statistic measurement, or real-time measurement, and conduct normal interact with the UE using a Uu protocol, but the Uu protocol messages exchanged between UE and RAN are encapsulated in the over-the-top (OTT) IP packets. The RAN UIF may expose several types of API to the UE or other authorized functions, such as core functions including a network exposure function (NEF). Through a UE measurement collection API, the UE may provide air-interface measurements, including statistic measurements, or real-time measurements, in order to assist a gNB for better resource scheduling. Through Uu interaction APIs, the UE may be allowed to interact with gNB as if the UE is in contact with a gNB via the Uu interface, but actually through a secure IP connection such as a URLLC connection to reduce the control message latency. In particular embodiments, the API may be accessed via the NEF or a security tunnel via a normal data plane. In some embodiments, the RAN may use this UIF and API to collect UE's measurement. Embodiments allow for the UE to actively connect to two different networks with only one transmission channel (TX).

Figure 3:
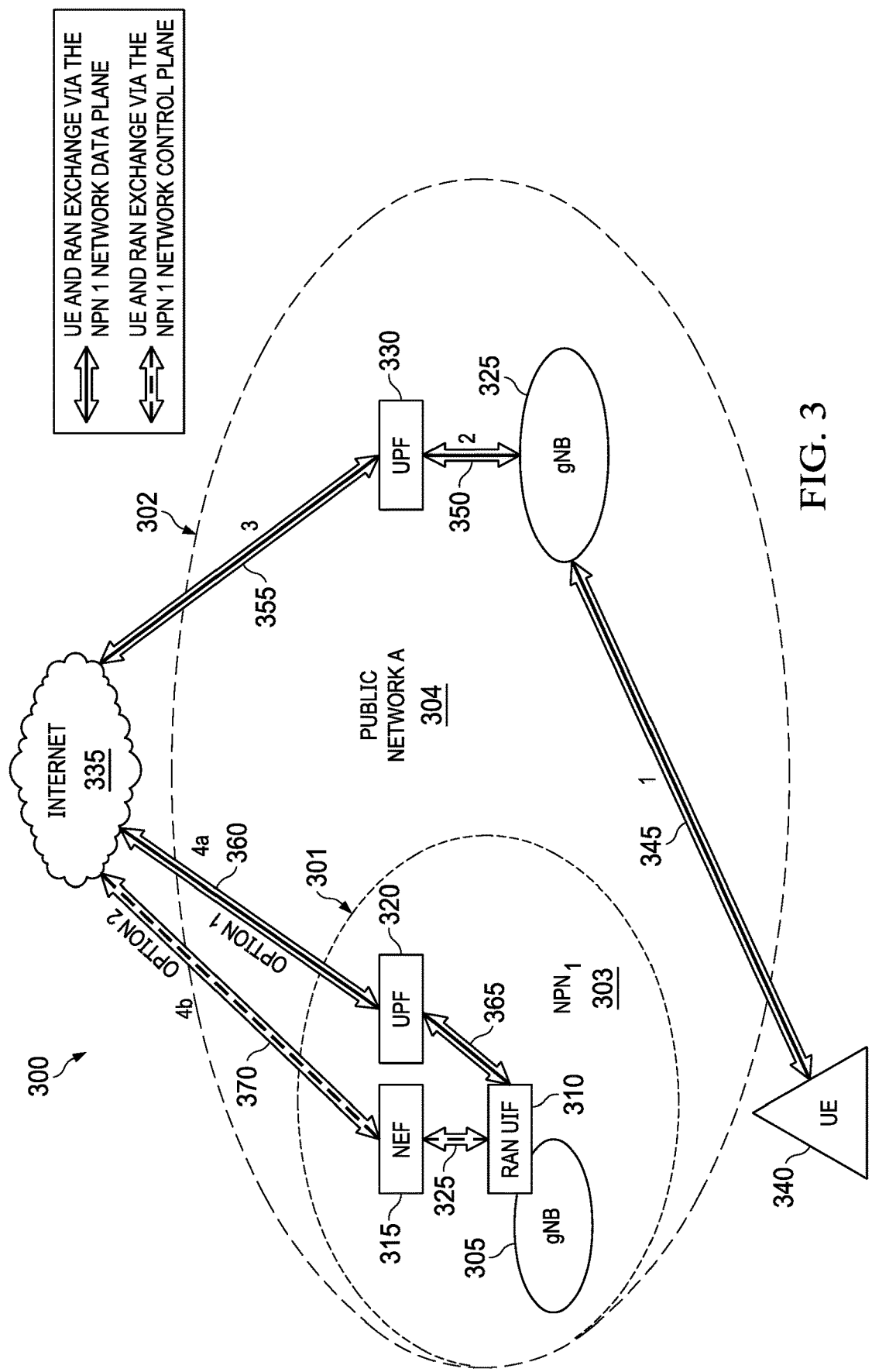
FIG. 3 illustrates a diagram of an embodiment of a system for a user equipment (UE) to establish a communication channel with a non-public network (NPN) via a public network.

FIG. 3 illustrates a diagram of an embodiment of a system 300 for a UE 340 to establish a communication channel with an NPN 303 via a public network 302. The public network 304 includes a first gNB 325 and a user plane function (UPF) 330. The NPN 303 includes a second gNB 305, an NEF 315, and a RAN UIF 320. The public network 302 is in communication with the NPN 303 via the internet 335. In a first step, the UE 340 establishes a new dedicated URLLC data connection 345 with the first gNB 325 of the public network 340 for the purpose of establishing a secure communication channel with the NPN 303. In an alternative embodiment, the UE 340 can reuse an existing data connection. In a second step, the gNB 325 establishes a data plane connection 350 with UPF 330. In a third step, the UE 340 uses the connection of the public network 304 to create an over-the-top connection 355 with the NPN 303. In an embodiment of a fourth step, the UE 340 establishes a connection 360, 365 with the RAN UIF 310 directly via the PNP's UPF 330 via a core network, by sending a message via a particular port of the RAN UIF 310. In an alternative embodiment of the fourth step, the UE 240 interacts with the NEF 315 of the NPN 303 by using an API exposed by the NEF 315 using a control plane connection 370, then the NEF 315 forwards the information to the RAN UIF 310 or the second gNB 305 using the control plane, and forwards the control information of the second gNB 305 to the UE 340 via the API to the UE 340.

In some embodiments, the network notification for the UE to split two receive (RX) channels is sent between the NPN and the MNO network. In order to keep two active connections between the NPN and public MNO, the UE needs to allocate one RX channel for the MNO and the other for the NPN. However, when the UE splits the RX channels, the QoS of the connections with the MNO while using two RX channels may be impacted. Some QoS related core network functions, such as the QoS monitor, policy analytic functions (e.g., policy control function (PCF), network work data analytic function (NWDAF), or charging function (CHF)), may need to be notified. Also in order for network to activate the UE for receiving MBMS, the network may need to send an activation request to the UE after it is aware that the UE is able to receive.

In accordance with an embodiment, a UE driven UE and network coordinated RX split mechanism is provided. In this mechanism, a hardware configuration change notification information element (IE) is provided, which is sent by the UE to indicate to the network that some UE configuration has changed which may impact the QoS. An IE set may be provided to include a TX split start indicator. The TX split start indicator may also associate with timer information, which indicates when the split is expected to start after the indicator is sent.

In an embodiment, the IE can be carried in a layer 2 MAC message between the UE and the RAN, and then sent to a 5G Core, or in NAS message between UE and the 5G Core. A UE Rx split notification may be sent to the MNO via an API exposed by the MNO. In this case, the NPN MBMS server may establish an N33 connection with the MNO as an application function (AF). The AF may interact with 3GPP network functions. After the network receives the TX split indicator, the network may configure the network resource accordingly, or update a QoS configuration for the services provided to the UE.

In another embodiment, a network driven RX channel split in which the network is an initiator and controller for UE RX channel split is provided in which a first RX channel of the UE is allocated to a first network (e.g., a NPN) and a second RX channel of the UE is allocated to a second network (e.g., a MNO). In some embodiments, a UE successfully connects to the NPN, but has not started to receive MBMS traffic from the NPN. If there is business agreement between the MNO (network 1) and the NPN, the MNO is notified that the UE has been successfully authorized to connect to the NPN and is ready to receive MBMS traffic.

In an embodiment, the MNO acts as an authenticator proxy for the NPN to authenticate and authorize the UE. Accordingly, the MNO is aware if the UE is authorized to receive MBMS from the NPN. In another embodiment, an MBMS server associated with the NPN establishes a connection with the MNO as an AF, and sends a traffic split request to the MNO via an API of the MNO, such as an API of a NEF or other API function, to request the MNO to allow the UE to receive traffic from the NPN. In particular embodiments, the API may be a new API to allow an application to conduct communication level configurations, such as split traffic, and support dual active connections with two RX channels.

In an embodiment, after the MNO is notified that the UE is ready for RX channel split, the MNO may configure its network resource and potentially reconfigure the QoS of the services to prepare for possible performance deterioration. The MNO then sends an RX channel split request to the UE. In particular embodiments, the RX channel split request may be sent via a non-standalone access (NSA) message or a media access control (MAC) layer message. Upon receiving the Rx split request, the UE may split the RX channels of the UE to connect to the NPN and start to receive MBMS traffic from the NPN.

Figure 4:
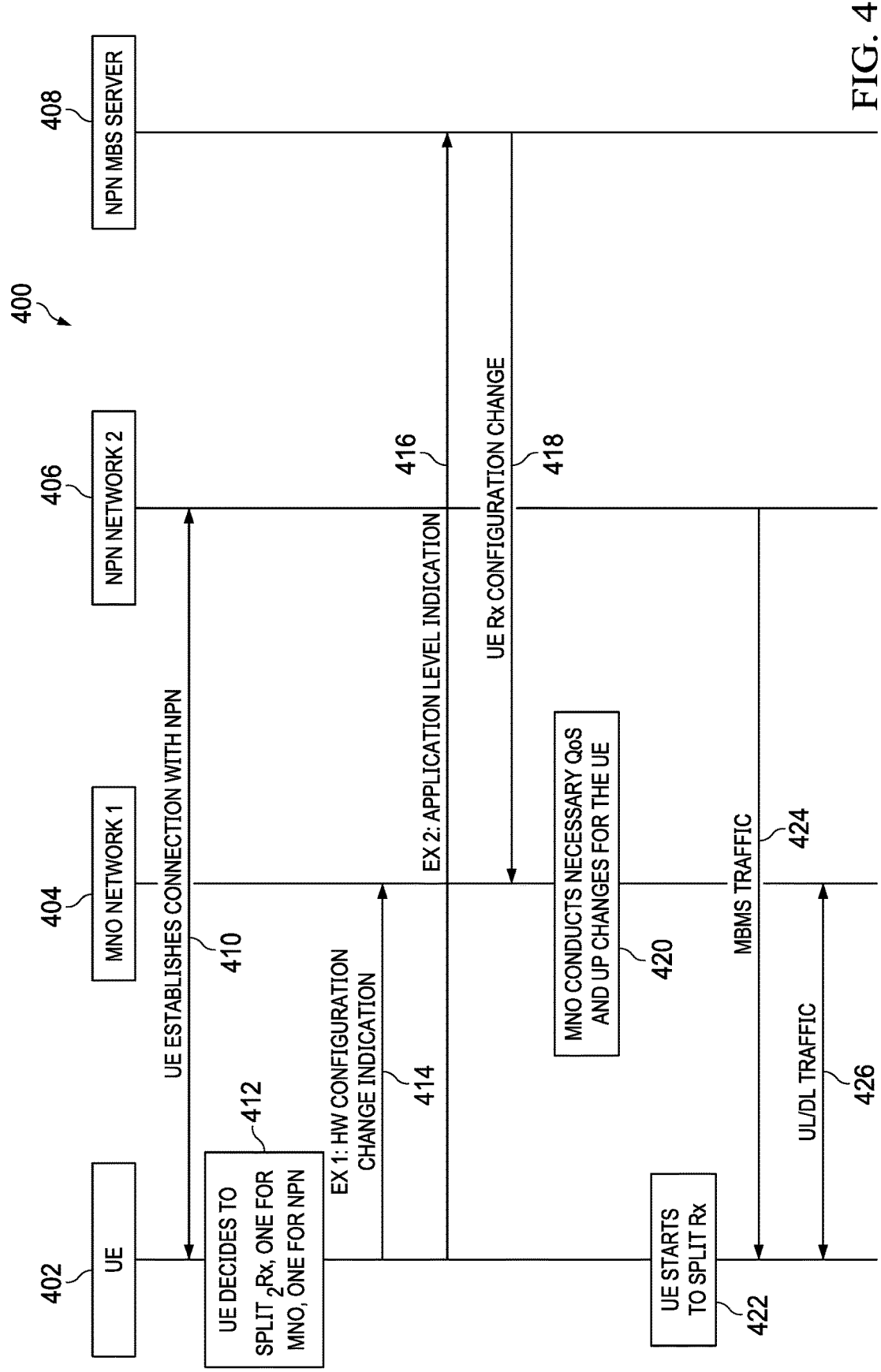
FIG. 4 illustrates a diagram of an embodiment of a process for network notification of a UE-driven receive (RX) channel split.

FIG. 4 illustrates a diagram of an embodiment of a process 400 for network notification of a UE-driven RX channel split. The process 400 includes a UE 402, a MNO network (network 1) 404, an NPN (network 2) 406, and an NPN mobile broadcast service (MBS) server 408 associated with the NPN 406. At 410, the UE 402 establishes a connection with the NPN 406. At 412, the UE 402 decides to split the two RX channels of the UE 402 to allocate a first RX channel to the MNO network 404 and a second RX channel to the NPN 406.

At 414, the UE 402 sends a hardware configuration change indication to the MNO network 404 to indicate that the UE channel configuration has changed that may require QoS and/or UP changes for the UE 402. The indication may include a TX channel split start indicator indicative of a time at which the RX channel split is to occur. The split start indicator may associate timer information which indicates a time at which the split is expected to start.

As an alternative embodiment to the UE 402 sending the hardware configuration change indication at 414, at 416 the UE 402 notifies the MBS server 408 of the split using an application level indication and at 418 the MBS server 408 notifies the MNO network 404 of the UE RX channel configuration change. In some embodiments, both of the methods of notifying the MNO network 404 of the split may be used together.

At 420, the MNO network 404 conducts the necessary QoS and user plane (UP) changes for the UE 402. At 422, the UE 402 starts to split the RX channel allocation by allocating the first RX channel to the MNO network 404 and the second RX channel to the NPN 406. At 424, the UE 402 receives MBMS traffic from the NPN 406. At 426, UE 402 exchanges uplink/downlink traffic with the MNO network 404.

Figure 5:
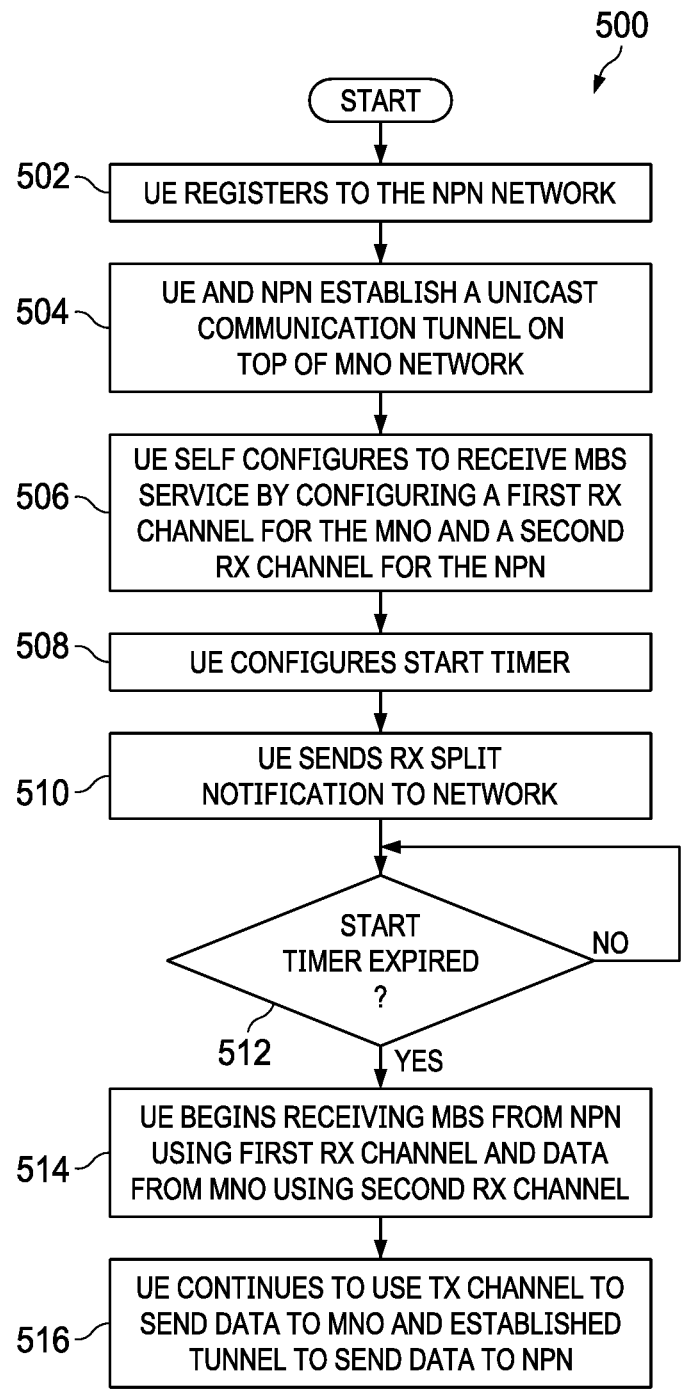
FIG. 5 illustrates a flowchart of a procedure of a UE during a UE-driven RX channel split according to an embodiment.

FIG. 5 illustrates a flowchart 500 of a procedure of a UE during a UE-driven RX channel split according to an embodiment. In step 502, the UE 402 registers to the NPN 406. In step 504, the UE establishes a unicast communication tunnel with the NPN 406 on top of the MNO network 404. In step 506, the UE 402 self-configures to receive MBS service by configuring a first RX channel for the MNO network 404 and a second RX channel for the NPN 406. In step 508, the UE 402 configures a start timer indicating a time that the RX split will occur when the start timer expires.

In step 510, the UE 402 sends an RX split notification message to one or more of the MNO network 404 or the NPN 406. In step 512, the UE 402 determines whether the start timer has expired. If the start timer has not expired, the UE 402 returns remains at step 512. If the start time has expired, at step 514 the UE 402 begins receiving the MBS from the NPN 406 using the first RX channel and data from the MNO network 404 using the second RX channel. In step 516, the UE 402 continues to use the TX channel of the UE 402 to send data to the MNO network 404, and the established tunnel to send data to the NPN 406.

Figure 6:
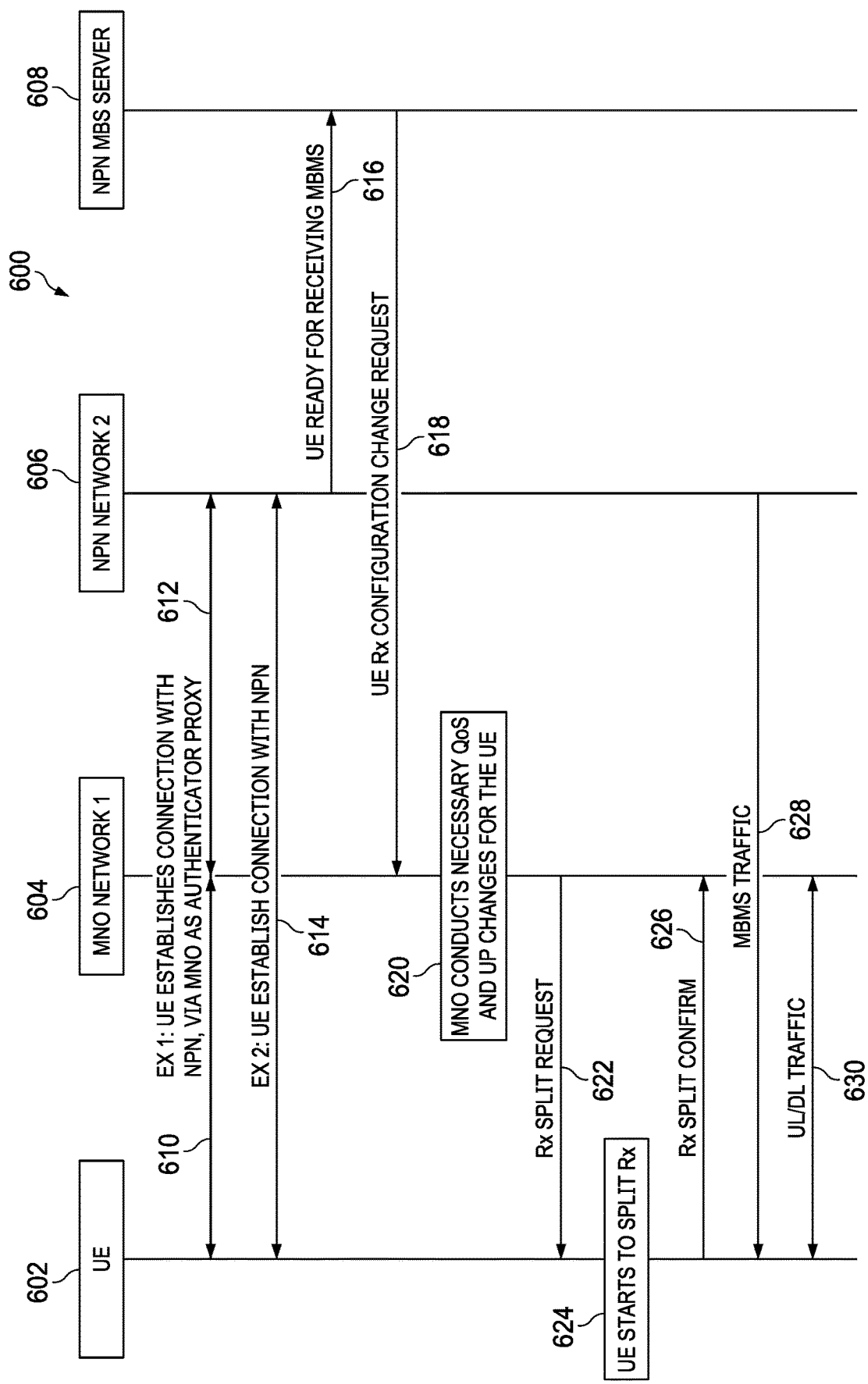
FIG. 6 illustrates a diagram of an embodiment of a process for network notification of a network-driven RX channel split.

FIG. 6 illustrates a diagram of an embodiment of a process 600 for network notification of a network-driven RX channel split. The process 600 includes a UE 602, a MNO network (network 1) 604, an NPN (network 2) 606, and an NPN MBS server 608 associated with the NPN 606. The UE 602 establishes a connection 610 with the NPN 606 via the MNO network 604 as an authentication proxy 612. In an alternative embodiment, at 614 the UE 602 establishes a direction connection with the NPN 606. In some embodiments, both methods of establishing a connection between the UE 602 and the NPN 606 may be used together.

At 616, the NPN MBS server 608 receives an indication from the NPN 606 that the UE 602 is ready for receiving MBMS data. At 618, the NPN MBS server sends a UE RX configuration change request to the MNO network 604. At 620, the MNO network 604 conducts any necessary QoS and user plane (UP) changes for the UE 602. At 622, the MNO network 604 sends an RX split request to the UE 602 requesting that the UE 602 allocate a first RX channel to the MNO network 604 and a second RX channel to the NPN 606.

At 624, the UE 602 starts to split the RX channel allocation by allocating the first RX channel to the MNO network 604 and the second RX channel to the NPN 606. At 626, the UE 602 sends a split confirmation message to the MNO network 604. At 628, the UE 602 receives MBMS traffic from the NPN 606. At 630, UE 602 exchanges uplink/downlink traffic with the MNO network 604.

Figure 7:
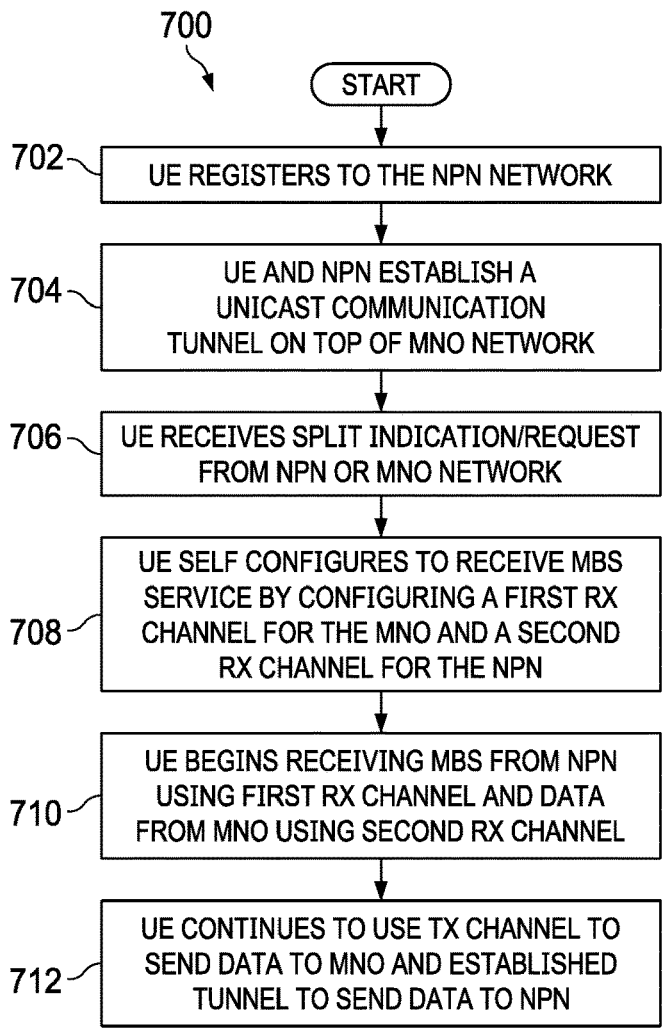
FIG. 7 illustrates a flowchart of a procedure of a UE during a network-driven RX channel split according to an embodiment.

FIG. 7 illustrates a flowchart 700 of a procedure of a UE during a network-driven RX channel split according to an embodiment. In step 702, the UE 602 registers to the NPN 606. In step 704, the UE establishes a unicast communication tunnel with the NPN 606 on top of the MNO network 604. In step 706, the UE 602 receives a split indication/request from the NPN 606 or the MNO network 604. In step 708, the UE 602 self-configures to receive MBS service by configuring a first RX channel for the MNO network 604 and a second RX channel for the NPN 606. In particular embodiments, the UE 602 may send a confirmation message to the NPN 606 or the MNO network 604 acknowledging receipt of the split indication/request.

In step 710, the UE 602 begins receiving the MBS from the NPN 606 using the first RX channel and data from the MNO network 604 using the second RX channel. In step 712, the UE 602 continues to use the TX channel of the UE 602 to send data to the MNO network 604, and the established tunnel to send data to the NPN 606.

Figure 8:
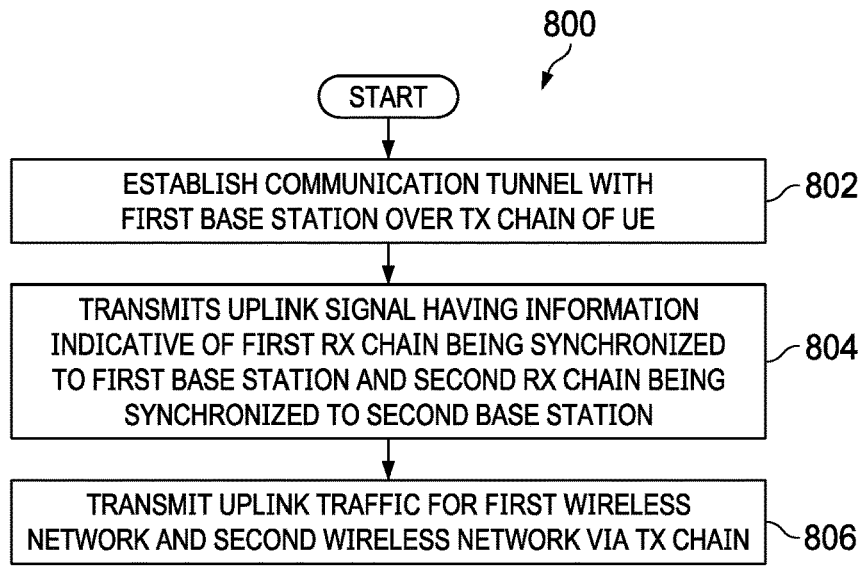
FIG. 8 illustrates a flowchart of operations of a UE according to an embodiment.

FIG. 8 illustrates a flowchart 800 of operations of a UE according to an embodiment. In the embodiment, the UE is configured to communication with a first wireless network associated with a first base station and a second wireless network associated with a second base station. In step 802, the UE establishes a communication tunnel with the first base station over a transmit chain (TX chain) of the user equipment. In the embodiment, the TX chain is synchronized with the second base station. In an embodiment, the communication tunnel established between the first wireless network and the second wireless network allows the UE to communicate with the first wireless network associated with the first base station via the second wireless network associated with the second base station.

In step 804, the UE transmits, via the TX chain of the UE, an uplink signal to the first wireless network associated with the first base station or the second wireless network associated with the second base station. In the embodiment, the uplink signal includes information indicative of a first receive chain (RX chain) of the UE being synchronized to the first base station and a second RX chain of the UE being synchronized to the second base station. In an embodiment, the UE receives a request from the first base station or the second base station requesting the UE to synchronize the first RX chain of the UE to the first base station and synchronize the second RX chain of the UE to the second base station. In an embodiment, the synchronizing of the first RX chain and the second RX chain is responsive to receiving the request. In an embodiment, the request further requests the UE to synchronize the TX chain to one or more of the first base station or the second base station. In another embodiment, the synchronizing of the first RX chain and the second RX chain is initiated by the UE.

In an embodiment, the uplink signal further includes an indication of a start time for the UE to receive at least one of first data from the first base station or second data from the second base station.

In step 806, the UE transmits uplink traffic for the first wireless network and the second wireless network to the second base station via the TX chain of the UE. In an embodiment, the uplink signal transmitted to the first base station uses the communication tunnel. In an embodiment, data associated with the uplink signal to the first base station is encapsulated in an over-the-top (OTT) internet protocol (IP) packet.

In an embodiment, the information further includes an indication that the TX chain of the UE will be synchronized with the second base station only, and the uplink data to the first wireless network passes through the second wireless network associated with the second base station.

In an embodiment, the UE transmits the uplink signal to an application server and the second wireless network associated with the second base station. In the embodiment, the application server and the second wireless network are configured to notify the first base station of the synchronizing of the first RX chain and the second RX chain.

In an embodiment, the first base station is associated with one of a mobile network operator (MNO) network or a non-public network (NPN). In an embodiment, the second base station is associated with one of a mobile network operator (MNO) network or a non-public network (NPN).

In an embodiment, the first base station is configured to provide one or more of a mobile broadcast service (MBS), unicast service, or other services to the UE. In another embodiment, the synchronizing of the first RX chain and the second RX chain are responsive to the UE receiving user and control traffic from the first wireless network and the second wireless network, respectively.

Figure 9:
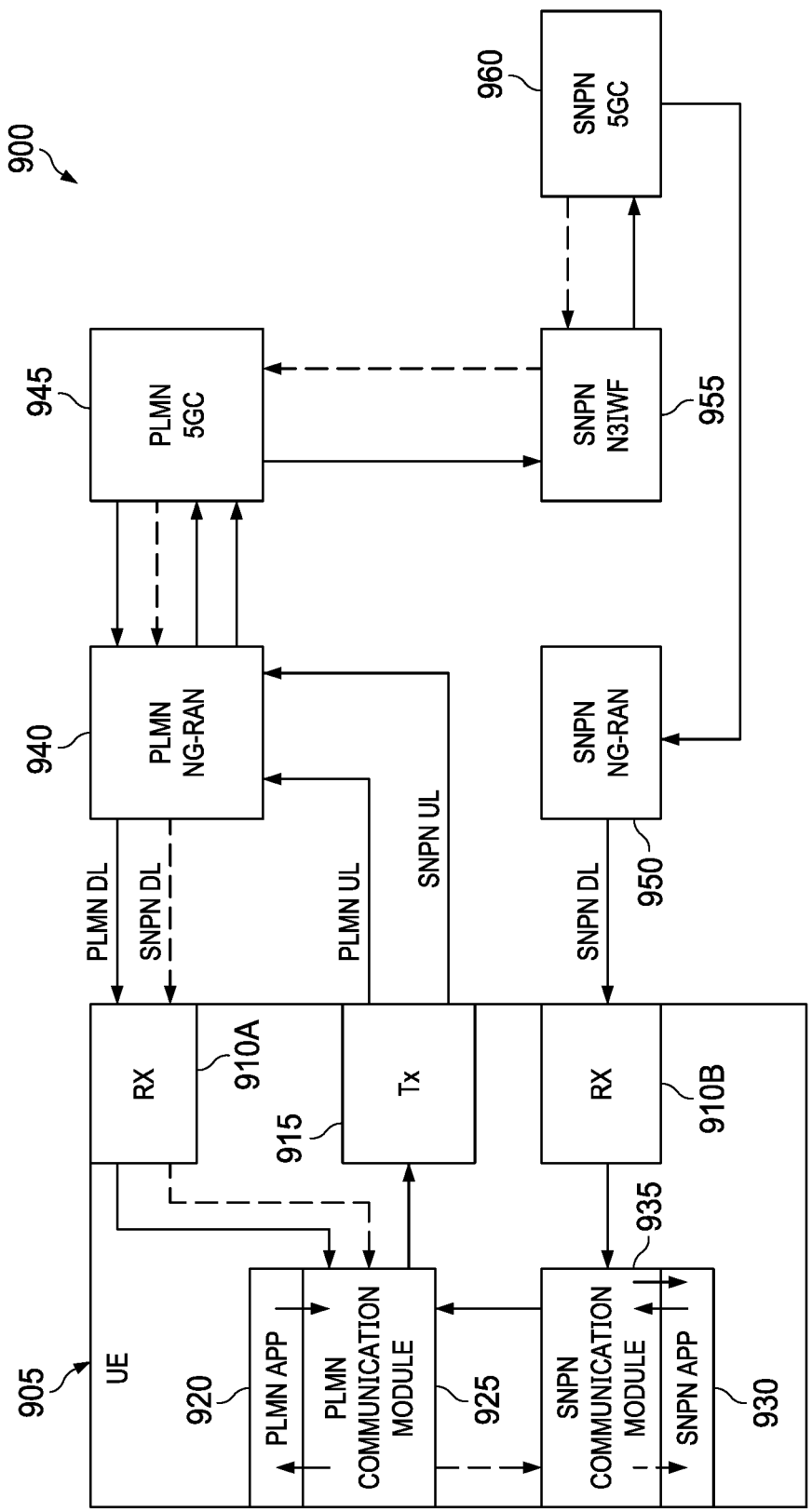
FIG. 9 illustrates a diagram of an embodiment of a system for a UE to establish a communication channel with an NPN via a public network.

FIG. 9 illustrates a diagram of an embodiment of a system 900 for a UE 905 to establish a communication channel with an NPN via a public network. In the embodiment illustrated in FIG. 9, the NPN is a standalone NPN (SNPN) and the public network is a PLMN. The UE 905 includes a first RX 910A, a second RX 910B, and a TX 915. The UE 905 further includes a PLMN application 920, a PLMN communication module 925, an SNPN application 930, and a SNPN communication module 935. The PLMN includes a PLMN Next-Generation Radio Access Network (NG-RAN) 940 and a PLMN 5G core (5GC) 945. The SNPN includes a SNPN NG-RAN 950, a SNPN Non-3GPP Interworking Function (N3IWF) 955, and a SNPN 5GC 960. In particular embodiments, the UE 905 is in overlapped coverage areas served by the both the PLMN NG-RAN 940 and the SNPN NG-RAN 950.

In the embodiment, N3IWF 955 provides an interworking gateway to allow the UE 905 to send and receive data to and from two different wireless networks (e.g., the PLMN and the SNPN) simultaneously with a single transmission channel (TX 915) and two receiving channels (RXs 910A-910B). In the embodiment, a traffic split and routing mechanism is provided using the N3IWF 955.

In an embodiment, UE 905 can be simultaneously attached and connected to both the SNPN and PLMN while keeping active data sessions with both networks at the same time, for example, during a live production with integrated audience services. In particular embodiments, the PLMN and the SNPN) can be operated by different operators, and the UE 905 may have separated subscriptions to both the PLMN and the SNPN. In an embodiment, the UE 905 shares the TX 915 for the UL traffic for both the SNPN and the PLMN, and splits the first RX 910A and the second RX 910B to each network for their DL user plane traffic. In particular, the first RX 910A receives PLMN downlink traffic (PLMN DL) directly from the PLMN NG-RAN 940, and the second RX 910B receives SNPN downlink traffic (SNPN DL) directly from the SNPN NG-RAN 950. The TX 915 of UE 905 is connected to the PLMN NG-RAN 940, and the UE 905 sends PLMN UL traffic and SNPN UL traffic over the PLMN to SNPN N3IWF 955. In one or more embodiments, the system 900 may support both multicast and unicast traffic.

Accordingly, the UE 905 is configured to receive SNPN DL user plane traffic from the PLMN NG-RAN 940 via the SNPN N3IWF 955 using the first RX 910A when it is needed. At the same time, the UE 905 can use the second RX 910B as well as the shared TX 915 to send and receive user PLMN traffic. Using this traffic split capability and selecting a network to which the TX will be camped may be configured by UE implementation or by operator policy. By splitting the traffic between going through a corresponding RAN for downlink traffic and the SNPN N3IWF 955 for uplink traffic, the UE 905 can simultaneously send data to both networks at the same time without suspending transmission in any network.

In one or more embodiments, when the UE 905 registers with one overlay network (e.g., the PLMN) using a gateway (e.g., N3IWF 955), the UE 905 provides the underlay network (which provides underlay connectivity for a tunnel with the overlay network) with the connectively information of the overlay network in order to assist the overlay network to acquire QoS information from the underlay network. In particular embodiments, the connectivity information may include a Cell ID, a data session ID, or a timing advance (TA).

In a particular embodiment, the same SNPN Access and Mobility Management Function (AMF) is selected and user for the UE 905 for registrations with both networks via the SNPN NG-RAN 950 and SNPN N3IWF 955. In an embodiment, the UE 905 registers to the SNPN via a 5G Uu interface for DL only traffic and registers to the SNPN via a 5G NWu interface for UL traffic and other DL traffics. During the registrations, the UE 905 provides a split indication to the network to assist the network in configuring the different traffic paths. In one or more embodiments, the split indication includes information indicating how the UE 905 wants to split traffic in the upper layer, for example, to maximize the data session for each path. In a particular embodiment, a Non-Access Stratum (NAS) control plane between the AMF and the UE 905 is implemented via the NWu interface. In particular embodiments, a session management function (SMF) and user plane function (UPF) utilize the split indication from UE 905 and network policies to create, configure and correlate the DL and UL traffic flows following defined session management procedures.

In one or more embodiments, the UE 905 is able to receive enhanced 5G core network paging responses while the UE 905 is also connected to the network with the N3IWF 955. In a particular embodiment, the SNPN sends paging messages to the UE 905 via the Uu interface and the UE 905 responds to the paging messages via the NWu interface. If the UL data UE sent is a paging response or other NAS message, the data is transmitted via a signaling IPSec Security Association (SA). In an embodiment, if the UL data is normal user plane data, the UL data may be transmitted via an IPsec child SA.

Figure 10A:
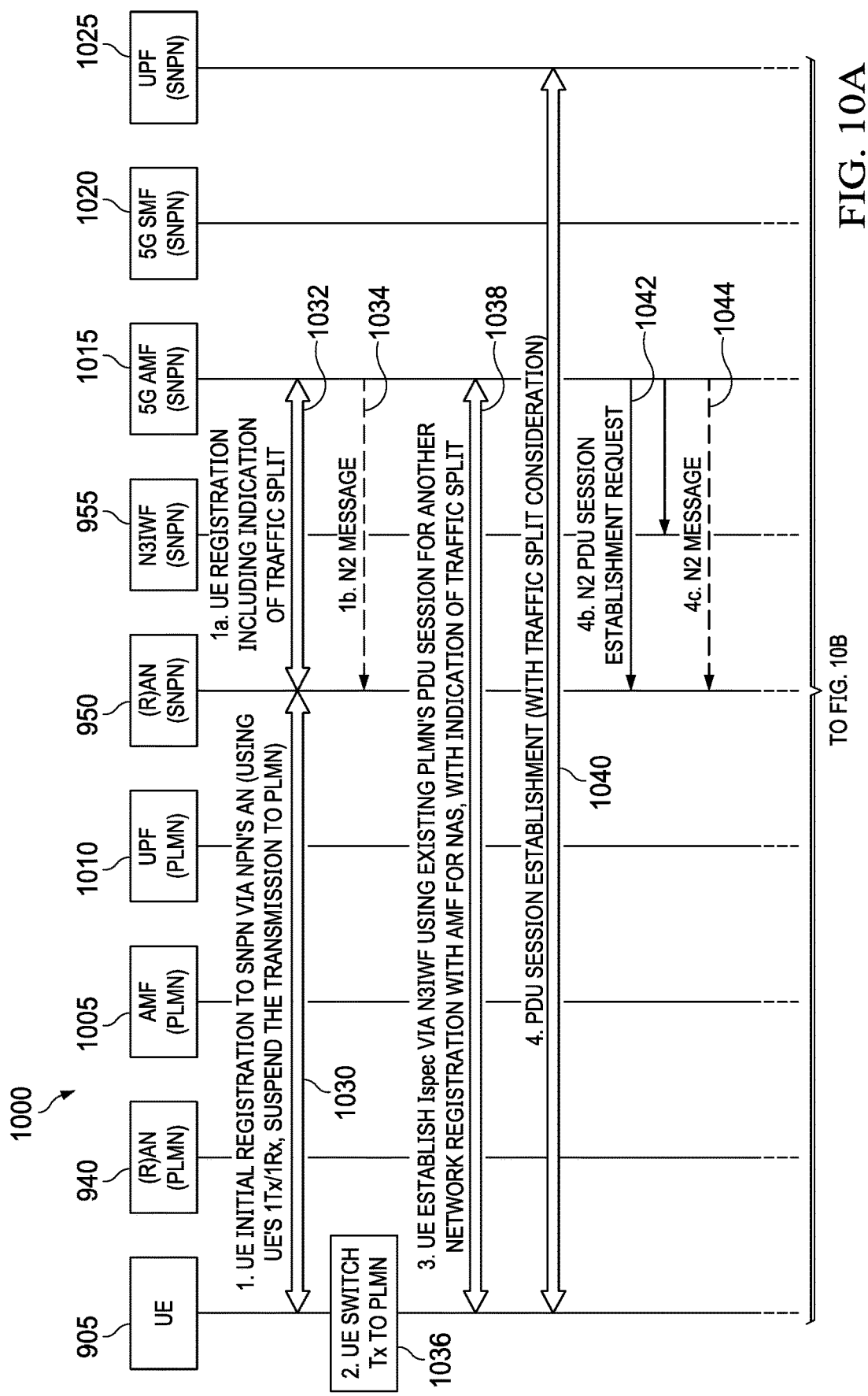
FIGS. 10A-10B illustrate a diagram of an embodiment of a process for network notification of a UE-driven RX channel split and simultaneous connection with a NPN and a PLMN.
Figure 10B:
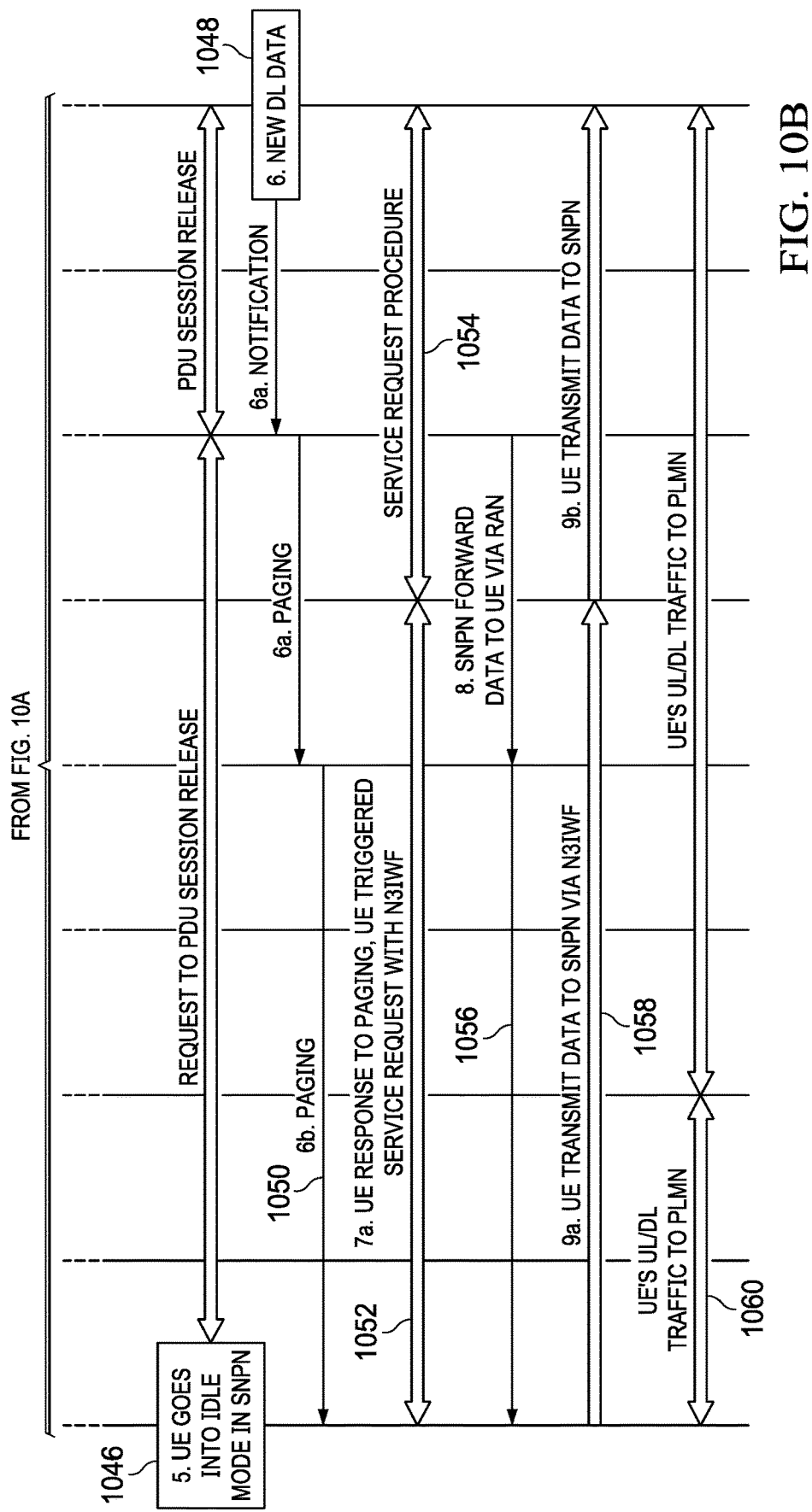

FIGS. 10A-10B illustrates a diagram of an embodiment of a process 1000 for network notification of a UE-driven RX channel split and simultaneous connection with a NPN and a PLMN. The process 1000 includes the UE 905 having a simultaneous connection with a PLMN and a SNPN. The PLMN includes the PLMN RAN 940, a PLMN AMF 1005, and a PLMN UPF 1010. The SNPN includes the SNPN RAN 940, the N3IWF 955, a 5G AMF 1015, a 5G SMF 1020, and a UPF 1025.

In step 1030, the UE 905 switches its transmitter to the SNPN RAN 940 to conduct initial registration with the SNPN RAN 940 to be configured with an N2 interface between the SNPMN 940 and the 5G AMF 1015, and allow the UE 905 to synchronize with the SNPN RAN 940 for receiving data. It is assumed that the UE 905 is already registered in the PLMN, so that the UE 905 can suspend traffic transmission with the PLMN and use the transmitter to communicate with the SNPN.

In step 1032, the SNPN RAN 950 communicates the UE registration with the 5G AMF 1015. During the UE registration with the 5G AMF 1015, the UE 905 sends traffic split indication to indicate to the network that the UE 905 can split the 2 RX channels and 1 TX channel, and communicate corresponding UL/DL traffic via different paths after the network registration. During step 1032, the 5G AMF 1015 may allocate a 5G Global Unique Temporary Identifier (5G-GUTI) for the UE 905, which the UE 905 will provide to the 5G AMF 1015 during secondary registration via the N3WIF 955. In step 1034, the 5G AMF 1015 correlates these two phases of registrations together and send an N2 message to SNPN RAN 950 as a verification that the UE 905 has successfully registered to SNPN RAN 950. The split indication indicates to the 5G AMF 1015 that the NAS control plane between the 5G AMF 1015 and the UE 905 is passed by the NWu interface. In a particular embodiment, the 5G AMF 1015 will not accept any new protocol data unit (PDU) session establishment request until the UE 905 completes its secondary registration with the 5G AMF 1015 via the NWu interface and is ready to receive and send data simultaneously.

In step 1036, the UE 905 switches its transmitter to the PLMN and resumes data transmission with the PLMN after the UE completes initial registration with the SNPN. In step 1038, the UE establishes an IPsec by creating a new PDU session or re-uses an existing PDU session of the PLMN to start second registration with the 5G AMF 1015 via the N3IWF 955 to prepare the UL data path with the SNPN. In this step, the UE 905 provides the 5G AMF 1015 with the traffic split indication, as well as the previously allocated 5G-GUTI. The N3IWF 955 or the 5G AMF 1015 can use the split indication and 5G-GUTI to select the same AMF with which the UE 905 has conducted the first registration via the SNPN RAN 950. With this 5G-GUTI, the 5G AMF 1015 can associate this registration with the previous registration to identify the traffic split UE and skip some registration procedures if already conducted in step 1030. After step 1038, the 5G AMF 1015 and the UE 905 establish a NAS connection via the N3IWF 955.

In step 1040, the UE 905 initiates a PDU session establishment procedure with the 5G AMF 1015 for DL/UL data services. Because the 5G AMF 1015 has received traffic split information of the UE 905, the 5G AMF 1015 forwards the traffic split information to the 5G SMF 1020 which later also forwards the traffic split information to the UPF 1025. In particular embodiments, the traffic split information can include indication information such as that all UL traffic will be established via the Uu interface, or different DL filters for different DL paths such as that some DL traffic pass through the NWu interface, while other traffic will pass through the Uu interface, etc. In particular embodiments, based on network policy, different PDU sessions may be created based upon on the direction of traffic (e.g., DL/UL). In particular embodiments, within one bi-directional PDU session different QoS flows that are direction specific may be configured.

In step 1042, based upon the traffic split information, the 5G AMF 1015 sends a N2 PDU session establish request to the SNPN RAN 950 and the N3IWF 955 to set up downlink N2 with the SNPN RAN 950 and uplink with the N3IWF 955. In step 1044, the 5G AMF 1015 sends an N2 message to the SNPN RAN 950 to confirm the session establish request. If there is no NPN traffic to UE 905 for a predetermined time period, the UE 905 enters into an idle mode in the SNPN, and triggers an SNPN PDU session release with the 5G AMF 1015 and the UPF 1025. When new SNPN downlink data is available for the UE 905 is available at the UPF 1025, in step 1048, 5G AMF 1015 initiates a paging procedure and sends paging requests to the SNPN RAN 950. Subsequently, in step 1050 the SNPN RAN 950 broadcasts the paging requests.

In step 1052, after the paging request via the SNPN RAN 950, the UE initiates a service request procedure with the SNPN via the N3IWF 955 over the PLMN by sending a paging response message. In a particular embodiment, the UE 905 may insert a "response to paging" as a reason code within a response to the paging request. In 1054, the N3IWF 955 forwards the paging response to the UPF 1025 in the SNPN. In an embodiment, the UE 905 sends RRC messages to both the SNPN RAN 950 and the PLMN RAN 940 network with the single TX of the UE 905.

In step 1056, after the PDU session in the SNPN is established, the SNPN UPF 1025 starts to forward the DL data to the UE 905 via the SNPN RAN 950, while the UE 905 transmits the UL data via the over-the-top IPsec tunnel with the N3IWF 955 through the PLMN (step 1058). During this period, the UE 905 can still exchange data with the PLMN freely without interruptions (step 1060).

In one or more embodiments, one or more network elements provide a QoS mapping between a session or path associated with a first network (e.g., a PLMN) and session or path associated with a second network (e.g., a SNPN) indicative of a QoS associated with each session. One or more embodiments further provide a QoS mapping change notification mechanism between the first network and the second network to indicate QoS changes to one or more of the first network or the second network that may be necessary or desired.

In a particular embodiment, a service level agreement (SLA) may be in effect between the SNPN and the PLMN, and a policy for PLMN and SNPN QoS mapping change notification may be provisioned in a PCF. After the SLA change level agreement is reached, the PCF provisions the new QoS mapping policy to a UPF, and a PCF in the SNPN provisions the new QoS mapping policy to a N3IWF.

In another particular embodiment, the PLMN sends a QoS downgrade notification to the SNPN via an NEF indicating that the SNPN UE traffic has an unacceptable negative impact on the PLMN, and that the QoS of the SNPN is to be downgraded. In the embodiment, the SNPN receives the QoS downgrade notification via an AF and NEF interface.

In one or more embodiments, a network element maintains a QoS mapping relationship between the PDU session in the PLMN and the IPsec with the SNPN which includes information indicative of a QoS associated with the PDU session path and the IPSec path. One or more embodiments provides a PLMN and SNPN QoS mapping change notification mechanism between the overlay and underlay network to indicate QoS changes that may be required due to UE traffic. For example, if a large amount of SNPN traffic with the UE 905 is detected that may have a negative impact on the PLMN, the PLMN may send a QoS mapping change notification including a QoS downgrade notification to the SNPN indicating that a QoS of the SNPN is to be downgraded. If the condition causing the QoS downgrade is determined to no longer be present, the PLMN may send a QoS mapping change notification including a QoS upgrade notification indicating that the QoS of the SNPN is to be upgraded. In particular embodiments, the QoS mapping change notification can be per N3IWF or a group of IPSec such as including all of the per-IPSec Child Security Associations related to the same QoS/service. In a particular embodiment, the QoS mapping change notification may include a 5G QoS Identifier (5QI).

Figure 11:
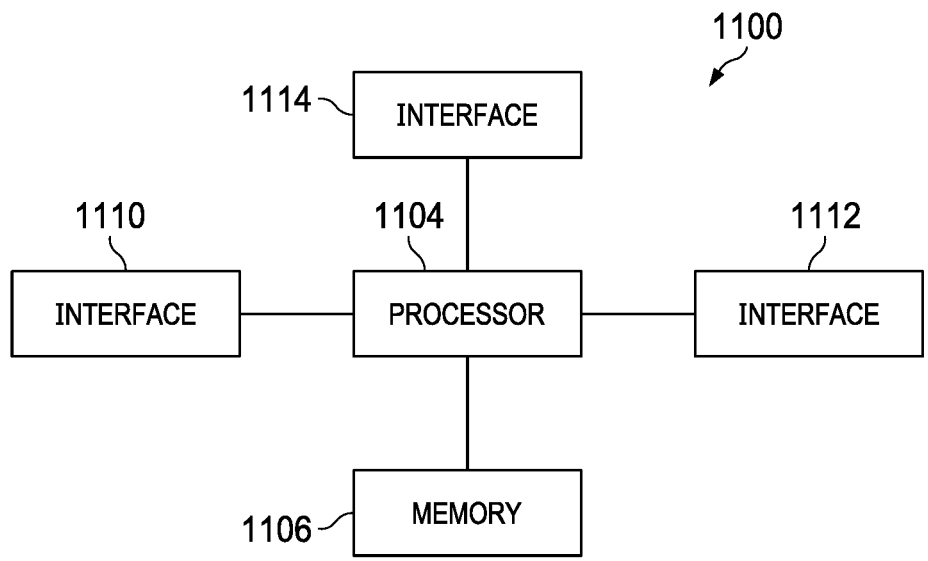
FIG. 11 illustrates a block diagram of an embodiment of a processing system.

FIG. 11 illustrates a block diagram of an embodiment of a processing system 1100 for performing methods described herein, which may be installed in a host device. As shown, the processing system 1100 includes a processor 1104, a memory 1106, and interfaces 1110-1114, which may (or may not) be arranged as shown in FIG. 11. (Original) The processor 1104 may be any component or collection of components adapted to perform computations and/or other processing related tasks, and the memory 1106 may be any component or collection of components adapted to store programming and/or instructions for execution by the processor 1104. In an embodiment, the memory 1106 includes a non-transitory computer readable medium. The interfaces 1110, 1112, 1114 may be any component or collection of components that allow the processing system 1100 to communicate with other devices/components and/or a user. For example, one or more of the interfaces 1110, 1112, 1114 may be adapted to communicate data, control, or management messages from the processor 1104 to applications installed on the host device and/or a remote device. As another example, one or more of the interfaces 1110, 1112, 1114 may be adapted to allow a user or user device (e.g., personal computer (PC), etc.) to interact/communicate with the processing system 1100. The processing system 1100 may include additional components not depicted in FIG. 11, such as long term storage (e.g., non-volatile memory, etc.).

In some embodiments, the processing system 1100 is included in a network device that is accessing, or part otherwise of, a telecommunications network. In one example, the processing system 1100 is in a network-side device in a wireless or wireline telecommunications network, such as a base station, a relay station, a scheduler, a controller, a gateway, a router, an applications server, or any other device in the telecommunications network. In other embodiments, the processing system 1100 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

In some embodiments, one or more of the interfaces 1110, 1112, 1114 connects the processing system 1100 to a transceiver adapted to transmit and receive signaling over the telecommunications network.

Figure 12:
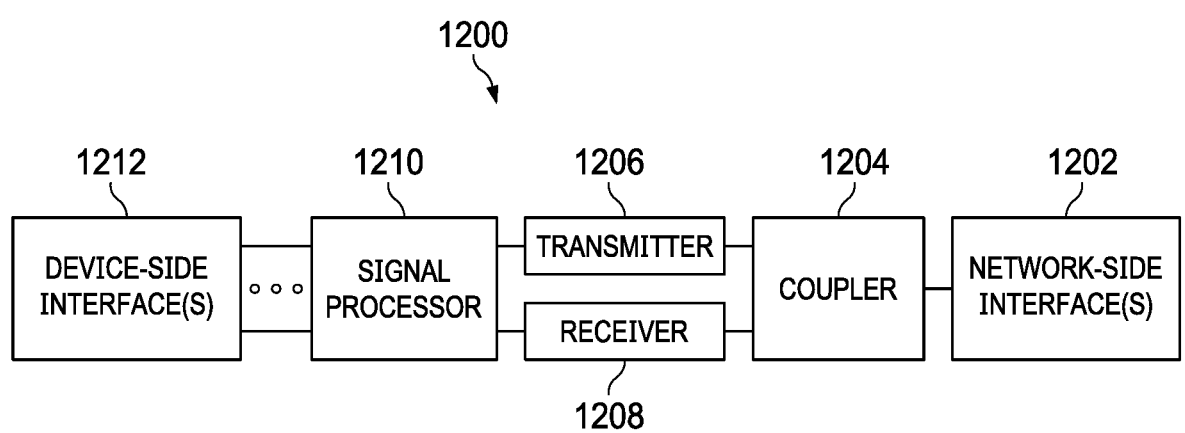
FIG. 12 illustrates a block diagram of an embodiment of a transceiver adapted to transmit and receive signaling over a telecommunications network.

FIG. 12 illustrates a block diagram of an embodiment of a transceiver 1200 adapted to transmit and receive signaling over a telecommunications network. The transceiver 1200 may be installed in a host device. As shown, the transceiver 1200 comprises a network-side interface 1202, a coupler 1204, a transmitter 1206, a receiver 1208, a signal processor 1210, and a device-side interface 1212. The network-side interface 1202 may include any component or collection of components adapted to transmit or receive signaling over a wireless or wireline telecommunications network. The coupler 1204 may include any component or collection of components adapted to facilitate bi-directional communication over the network-side interface 1202. The transmitter 1206 may include any component or collection of components (e.g., up-converter, power amplifier, etc.) adapted to convert a baseband signal into a modulated carrier signal suitable for transmission over the network-side interface 1202. The receiver 1208 may include any component or collection of components (e.g., down-converter, low noise amplifier, etc.) adapted to convert a carrier signal received over the network-side interface 1202 into a baseband signal. The signal processor 1210 may include any component or collection of components adapted to convert a baseband signal into a data signal suitable for communication over the device-side interface(s) 1212, or vice-versa. The device-side interface(s) 1212 may include any component or collection of components adapted to communicate data-signals between the signal processor 1210 and components within the host device (e.g., the processing system 900, local area network (LAN) ports, etc.).

The transceiver 1200 may transmit and receive signaling over any type of communications medium. In some embodiments, the transceiver 1200 transmits and receives signaling over a wireless medium. For example, the transceiver 1200 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1002 comprises one or more antenna/radiating elements. For example, the network-side interface 1002 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1000 transmits and receives signaling over a wireline medium, e.g., twisted-pair cable, coaxial cable, optical fiber, etc. Specific processing systems and/or transceivers may utilize all of the components shown, or only a subset of the components and levels of integration may vary from device to device.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by an establishing unit/module, a determining unit/module, an evaluating unit/module, a storing unit/module, a requesting unit/module, and/or a multiplexing unit/module. The respective units/modules may be hardware, software, or a combination thereof. For instance, one or more of the units/modules may be an integrated circuit, such as field programmable gate arrays (FPGAs) or application-specific integrated circuits (ASICs).

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a registering unit/module, an establishing unit/module, a splitting unit/module, and/or a notification unit/module. The respective units/modules may be hardware, software, or a combination thereof. For instance, one or more of the units/modules may be an integrated circuit, such as field programmable gate arrays (FPGAs) or application-specific integrated circuits (ASICs).

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed is:

1. A method comprising:
    transmitting, via a transmit chain (TX chain) of a user equipment (UE), an uplink signal to a first wireless network associated with a first base station or a second wireless network associated with a second base station, the uplink signal including information indicative of a first receive chain (RX chain) of the UE being synchronized to the first base station to receive first traffic from the first wireless network and a second RX chain of the UE being synchronized to the second base station to receive second traffic from the second wireless network; and
    transmitting, by the UE, uplink traffic for the first wireless network and the second wireless network to the second base station via the TX chain of the UE while the UE maintaining an active connection with the first wireless network.

2. The method of claim 1, further comprising:
    establishing, by the UE, a communication tunnel with the first base station over the TX chain, the TX chain being synchronized with the second base station.

3. The method of claim 2, wherein the transmitting of the uplink signal to the first base station uses the communication tunnel.

4. The method of claim 3, wherein data associated with the uplink signal to the first base station is encapsulated in an over-the-top (OTT) internet protocol (IP) packet.

5. The method of claim 2, wherein the communication tunnel is established between the first wireless network and the second wireless network, the communication tunnel allowing the UE to communicate with the first wireless network associated with the first base station via the second wireless network associated with the second base station.

6. The method of claim 1, wherein the information further includes an indication that the TX chain of the UE will be synchronized with the second base station only, the uplink traffic to the first wireless network passing through the second wireless network associated with the second base station.

7. The method of claim 1, wherein the information further includes an indication that the TX chain of the UE will be synchronized and communicate with the first base station associated with the first wireless network either periodically or on-demand, and will be re-synchronized with the second base station.

8. The method of claim 7, wherein the information further includes at least one of a reason code, an indication of an interval for periodic synchronization, or an indication of a time period for the TX chain of the UE to be synchronized with the first base station.

9. The method of claim 1, further comprising:
receiving, by the UE, a request from the first base station or the second base station requesting the UE to synchronize the first RX chain of the UE to the first base station to receive the first traffic from the first wireless network, and synchronize the second RX chain of the UE to the second base station to receive the second traffic from the second wireless network.

10. The method of claim 9, wherein the synchronizing of the first RX chain and the second RX chain is responsive to receiving the request and user traffic.

11. The method of claim 9, wherein the request further requests the UE to synchronize the TX chain to one or more of the first base station or the second base station to transmit user traffic.

12. The method of claim 1, wherein the synchronizing of the first RX chain and the second RX chain is initiated by the UE.

13. The method of claim 1, wherein the UE transmits the uplink signal to an application server and the second wireless network associated with the second base station, the application server and the second wireless network being configured to notify the first base station of the synchronizing of the first RX chain and the second RX chain.

14. The method of claim 1, wherein the uplink signal further includes an indication of a start time for the UE to receive at least one of first data from the first base station or second data from the second base station.

15. The method of claim 1, wherein the first base station is associated with one of a mobile network operator (MNO) network or a non-public network (NPN).

16. The method of claim 1, wherein the second base station is associated with one of a mobile network operator (MNO) network or a non-public network (NPN).

17. The method of claim 1, wherein at least one of the first base station or the second base station is configured to provide one or more of a mobile broadcast service (MBS), unicast service, or other services to the UE.

18. The method of claim 1, wherein the synchronizing of the first RX chain and the second RX chain are responsive to receiving user and control traffic from the first wireless network and the second wireless network, respectively.

19. A user equipment (UE), comprising:
a non-transitory memory storage comprising instructions; and
one or more processors in communication with the non-transitory memory storage, wherein the one or more processors execute the instructions to cause the UE to:
transmit, via a transmit chain (TX chain) of the UE, an uplink signal to a first wireless network associated with a first base station or a second wireless network associated with a second base station, the uplink signal including information indicative of a first receive chain (RX chain) of the UE being synchronized to the first base station to receive first traffic from the first wireless network and a second RX chain of the UE being synchronized to the second base station to receive traffic from the second wireless network; and
transmit uplink traffic for the first wireless network and the second wireless network to the second base station via the TX chain of the UE while the UE maintaining an active connection with the first wireless network.

20. The UE of claim 19, further comprising instructions to cause the UE to:
establish a communication tunnel with the first base station over the TX chain, the TX chain being synchronized with the second base station.

21. The method of claim 2, wherein the first wireless network is an audio distribution non-public network (NPN), and the second wireless network is a mobile network operator (MNO) public network, the establishing comprising:
establishing, by the UE, the communication tunnel with the first base station over the TX chain via the second base station, the TX chain being synchronized with the second base station.

* * * * *